(12) United States Patent
Ludwig et al.

(10) Patent No.: US 10,511,166 B2
(45) Date of Patent: Dec. 17, 2019

(54) VOLTAGE CONVERTER HAVING A REVERSE POLARITY PROTECTION DIODE

(71) Applicant: PHOENIX CONTACT GMBH & CO KG, Blomberg (DE)

(72) Inventors: Holger Ludwig, Kassel (DE); Volker Weskamp, Bad Driburg/Neuenheerse (DE)

(73) Assignee: PHOENIX CONTACT GMBH & CO KG, Blomberg (DE)

( * ) Notice: Subject to any disclaimer, the term of this patent is extended or adjusted under 35 U.S.C. 154(b) by 0 days.

(21) Appl. No.: 16/301,071

(22) PCT Filed: May 10, 2017

(86) PCT No.: PCT/EP2017/061166
§ 371 (c)(1),
(2) Date: Nov. 13, 2018

(87) PCT Pub. No.: WO2017/194598
PCT Pub. Date: Nov. 16, 2017

(65) Prior Publication Data
US 2019/0190259 A1      Jun. 20, 2019

(30) Foreign Application Priority Data

May 13, 2016   (DE) .......................... 10 2016 108 942

(51) Int. Cl.
*H02M 1/00*      (2006.01)
*H02H 11/00*     (2006.01)
(Continued)

(52) U.S. Cl.
CPC ............ *H02H 11/002* (2013.01); *H02M 1/08* (2013.01); *H02M 3/158* (2013.01);
(Continued)

(58) Field of Classification Search
CPC .......... G05F 1/569; H02M 2001/0051; H02M 1/4225; H02H 7/1213
(Continued)

(56) References Cited

U.S. PATENT DOCUMENTS 5,067,066 A * 11/1991 Chida .................... H02M 3/158
                                                 323/222
5,095,261 A *  3/1992 Schoofs .................. H02H 9/04
                                                 323/222
(Continued)

FOREIGN PATENT DOCUMENTS

DE      102013104376 B3     9/2014
DE      102014108783 A1    12/2014
(Continued)

OTHER PUBLICATIONS

German Office Action from DE Application No. 102016108942.7, dated Apr. 11, 2017.
(Continued)

*Primary Examiner* — Gary A Nash
(74) *Attorney, Agent, or Firm* — Workman Nydegger

(57) ABSTRACT

A voltage transformer comprising a first input terminal and a second input terminal. An input voltage can be applied between the first input terminal and the second input terminal, a switch branch having a switch, wherein the switch is designed to close a circuit path between the first input terminal and the second input terminal, and a reverse polarity protection diode, which, in the switch branch, is connected in series with the switch.

14 Claims, 25 Drawing Sheets

(51) Int. Cl.
*H02M 3/158* (2006.01)
*H02M 1/08* (2006.01)
*G05F 1/569* (2006.01)
*H02M 1/42* (2007.01)
*H02H 7/12* (2006.01)

(52) U.S. Cl.
CPC ........... *H02M 3/1582* (2013.01); *G05F 1/569* (2013.01); *H02H 7/1213* (2013.01); *H02M 1/4225* (2013.01); *H02M 2001/0009* (2013.01); *H02M 2001/0051* (2013.01); *H02M 2001/0077* (2013.01)

(58) Field of Classification Search
USPC .................... 323/271, 277, 282, 285; 363/53
See application file for complete search history.

(56) References Cited

U.S. PATENT DOCUMENTS

| | | | | |
|---|---|---|---|---|
| 5,161,097 A | * | 11/1992 | Ikeda | ....................... G05F 1/563 |
| | | | | 323/222 |
| 8,717,717 B2 | * | 5/2014 | Mao | ........................ H02M 1/32 |
| | | | | 361/111 |
| 9,024,609 B2 | * | 5/2015 | Milavec | .................... H02J 1/10 |
| | | | | 323/224 |
| 2004/0051513 A1 | * | 3/2004 | Rupp | ...................... H02M 1/36 |
| | | | | 323/288 |
| 2013/0342139 A1 | * | 12/2013 | Shimomugi | .......... H02M 7/066 |
| | | | | 318/400.3 |
| 2015/0002125 A1 | | 1/2015 | Kinoshita et al. | |

FOREIGN PATENT DOCUMENTS

| | | |
|---|---|---|
| EP | 2670016 A2 | 12/2013 |
| EP | 2768130 A1 | 8/2014 |
| FR | 2973601 A1 | 10/2012 |

OTHER PUBLICATIONS

International Search Report from PCT Application No. PCT/EP2017/061166, dated Aug. 4, 2017.

* cited by examiner

VOLTAGE CONVERTER HAVING A REVERSE POLARITY PROTECTION DIODE

BACKGROUND

The present invention relates to the field of voltage converters for converting an electrical input voltage into an electrical output voltage.

Voltage converters are electrical circuits which are used to convert an electrical input voltage into an electrical output voltage. So-called DC/DC converters, which are a subcategory of voltage converters, are configured for example to convert an electrical input voltage into an electrical output voltage, both the electrical input voltage and the electrical output voltage being DC voltages. Voltage converters usually comprise a switch, for example a transistor, and reactive elements, for example a choke and a capacitor, wherein the switch is periodically opened and closed. By suitably controlling a duty cycle of the switch, it is therefore possible to set an operating point of the voltage converter.

SUMMARY

The input stages of voltage converters are usually very sensitive to a polarity reversal of the electrical input voltage and may be damaged by a high backward current flow in the event of a polarity reversal. Using bridge rectifiers in front of the input stages of the voltage converters or introducing diodes into a load current branch of the voltage converters is usually associated with high electrical losses, particularly in the diodes.

The problem addressed by the present invention is therefore that of providing an efficient concept for reverse polarity protection for voltage converters.

The invention is based on the discovery that the above problem can be solved by introducing a reverse polarity protection diode into a switch branch of the voltage converter, said diode being arranged in series with a switch of the voltage converter. The reverse polarity protection diode and the switch are therefore arranged in the same switch branch. This brings the advantage that a load current of the voltage converter is not applied to the reverse polarity protection diode. Only a switched current through the switch branch is applied to the reverse polarity protection diode, and this may have a much lower effective value. At the same time, the reverse polarity protection diode can accept an electrical input voltage of reversed polarity and at the same time block a backward current through the switch branch. Therefore, by introducing the reverse polarity protection diode, the switch can be effectively protected against damage. In addition, an electrical power loss in the reverse polarity protection diode can be effectively reduced.

According to a first aspect, the invention relates to a voltage converter comprising a first input terminal and a second input terminal, wherein an electrical input voltage is applicable between the first input terminal and the second input terminal, a switch branch having a switch, wherein the switch is configured to close a circuit path between the first input terminal and the second input terminal, and a reverse polarity protection diode which is connected in series with the switch in the switch branch. This brings the advantage that an efficient concept for reverse polarity protection can be realized for the voltage converter. The switch may be any semiconductor switch. The reverse polarity protection diode may be any semiconductor diode.

According to one embodiment, one terminal of the reverse polarity protection diode, in particular an anode terminal or a cathode terminal of the reverse polarity protection diode, is directly connected to one terminal of the switch. This brings the advantage that better protection against reverse polarity can be realized. The reverse polarity protection diode may for example be arranged immediately upstream or immediately downstream of the switch in the switch branch.

According to one embodiment, the reverse polarity protection diode is configured to conduct a current through the switch branch when the input voltage has a first polarity, and to block a current through the switch branch when the input voltage has a second polarity. This brings the advantage that better protection against reverse polarity can be realized. The first polarity corresponds for example to a polarity of the input voltage during normal operation of the voltage converter. The second polarity may be opposite to the first polarity. The second polarity corresponds for example to a polarity of the input voltage in the event of a polarity reversal.

According to one embodiment, the switch is a bipolar transistor, a metal oxide semiconductor field-effect transistor (MOSFET), an insulated-gate bipolar transistor (IGBT), or a junction field-effect transistor (JFET). This brings the advantage that the switch can be efficiently implemented.

According to one embodiment, the reverse polarity protection diode is a Schottky diode. This brings the advantage that a low forward voltage of the reverse polarity protection diode can be realized. If a silicon carbide (SiC) Schottky diode is used as the reverse polarity protection diode, an electrical loss in the reverse polarity protection diode can be further reduced.

By using a Schottky diode, for example instead of a PN diode or a PiN diode, the forward voltage of the reverse polarity protection diode can be lowered. A silicon carbide (SiC) Schottky diode may, as a power diode, have a higher forward voltage than other types of silicon diodes. However, a silicon carbide (SiC) Schottky diode is characterized by lower switching losses, in particular by a reduced reverse recovery effect, as a result of which the switching losses can be further reduced.

According to one embodiment, the voltage converter comprises a first output terminal and a second output terminal, wherein an electrical output voltage can be tapped off between the first output terminal and the second output terminal, a choke which is arranged between the first input terminal and a terminal of the switch branch, a freewheeling diode which is arranged between the terminal of the switch branch and the first output terminal, and a capacitor which is arranged between the first output terminal and the second output terminal. This brings the advantage that the voltage converter can be efficiently implemented.

According to one embodiment, the voltage converter comprises a bypass diode which is arranged between the first input terminal and the first output terminal. This brings the advantage that the voltage converter can be efficiently implemented.

According to one embodiment, the voltage converter comprises a current measuring resistor which is connected in series with the switch and the reverse polarity protection diode in the switch branch. This brings the advantage that a current through the switch branch can be efficiently detected. The current measuring resistor may be a low-ohmic resistor.

According to one embodiment, the first input terminal or the second input terminal is connected to a ground potential. This brings the advantage that a ground reference can be efficiently provided.

According to one embodiment, the voltage converter comprises a third input terminal, wherein a further electrical input voltage is applicable between the second input terminal and the third input terminal, a further switch branch having a further switch, wherein the further switch is configured to close a further circuit path between the second input terminal and the third input terminal, and a further reverse polarity protection diode which is connected in series with the further switch in the further switch branch. This brings the advantage that a symmetrical voltage converter with middle potential can be efficiently realized. Reverse polarity protection can be achieved with regard to both the electrical input voltage and the further electrical input voltage. The further switch may have the same features as the switch described above. The further reverse polarity protection diode may have the same features as the reverse polarity protection diode described above.

According to one embodiment, the voltage converter is a DC/DC converter, in particular a step-up converter. This brings the advantage that the reverse polarity protection can be efficiently realized. The step-up converter is configured to convert an electrical input voltage into a higher electrical output voltage.

According to a second aspect, the invention relates to a voltage conversion system, comprising a voltage converter, wherein the voltage converter comprises a first input terminal and a second input terminal, wherein an electrical input voltage is applicable between the first input terminal and the second input terminal, wherein the voltage converter comprises a switch branch having a switch, wherein the switch is configured to close a circuit path between the first input terminal and the second input terminal, wherein the voltage converter comprises a reverse polarity protection diode which is connected in series with the switch in the switch branch, a main voltage converter which is electrically connected to the voltage converter, wherein the main voltage converter is arranged downstream of the voltage converter, and a controller which is configured to actuate the switch of the voltage converter, wherein the controller is configured to compare the input voltage of the voltage converter with a comparison voltage, and wherein the controller is configured to activate the voltage converter if the electrical input voltage of the voltage converter exceeds the comparison voltage. This brings the advantage that an efficient concept for reverse polarity protection can be realized for the voltage converter and the main voltage converter. The main voltage converter may be any voltage converter, in particular any DC converter or any AC converter.

According to one embodiment, the controller is configured to compare the input voltage of the voltage converter with a further comparison voltage, wherein the further comparison voltage is greater than the comparison voltage, and wherein the controller is configured to deactivate the voltage converter if the electrical input voltage of the voltage converter exceeds the further comparison voltage. This brings the advantage that the main voltage converter can be efficiently operated.

According to a third aspect, the invention relates to a method for operating a voltage conversion system, wherein the voltage conversion system comprises a voltage converter, a main voltage converter, and a controller, wherein the voltage converter comprises a first input terminal and a second input terminal, wherein an electrical input voltage is applicable between the first input terminal and the second input terminal, wherein the voltage converter comprises a switch branch having a switch, wherein the switch is configured to close a circuit path between the first input terminal and the second input terminal, wherein the voltage converter comprises a reverse polarity protection diode which is connected in series with the switch in the switch branch, wherein the main voltage converter is electrically connected to the voltage converter, wherein the main voltage converter is arranged downstream of the voltage converter, wherein the controller is configured to actuate the switch of the voltage converter, which method comprises comparing the input voltage of the voltage converter with a comparison voltage, this being carried out by the controller, and activating the voltage converter if the electrical input voltage of the voltage converter exceeds the comparison voltage, said activation being carried out by the controller. This brings the advantage that an efficient concept for reverse polarity protection can be realized for the voltage converter and the main voltage converter.

The method can be carried out by the voltage conversion system. Further features of the method will emerge directly from the functionality and/or the features of the voltage conversion system.

According to one embodiment, the method comprises comparing the input voltage of the voltage converter with a further comparison voltage, this being carried out by the controller, wherein the further comparison voltage is greater than the comparison voltage, and deactivating the voltage converter if the electrical input voltage of the voltage converter exceeds the further comparison voltage, said deactivation being carried out by the controller. This brings the advantage that the main voltage converter can be efficiently operated.

BRIEF DESCRIPTION OF THE DRAWINGS

Further exemplary embodiments will be explained in greater detail with reference to the appended drawings, in which.

DETAILED DESCRIPTION OF VARIOUS EMBODIMENTS

The concept for realizing reverse polarity protection can be used for example in a multi-stage voltage conversion system 1, in which one of the first active input stages is a voltage converter 20, in particular a step-up converter, with DC input. The voltage conversion system 1 may be a pure DC/DC voltage conversion system or a DC/AC voltage conversion system of single-phase or multi-phase type. The voltage conversion system 1 may have a wide input voltage range and may be operated by means of an advantageous method. The voltage conversion system 1 may be a converter with DC input.

Figure 1:
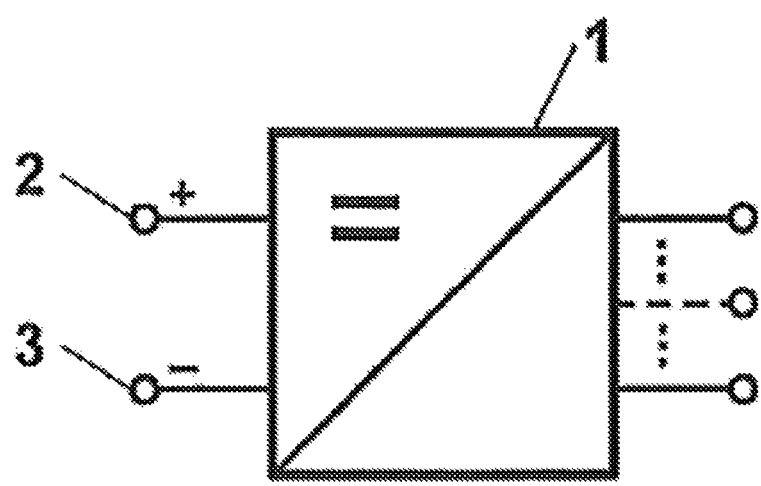
FIG. 1 shows a schematic diagram of a voltage conversion system with DC input.

Unlike a voltage conversion system with AC input, in which the connection of the input terminals may be arbitrary due to the fact that rectification is available, a rectifier is usually not present in a voltage conversion system with DC input. Since arbitrary connection of the input terminals 2 and 3 is possible on the voltage conversion system 1 with DC input of FIG. 1, it should be ensured for most topologies that the higher input potential is connected to the input terminal 2 and the lower input potential is connected to the input terminal 3. Otherwise, components may be damaged by a backward current flow or by the reverse-polarity input voltage.

Figure 2:
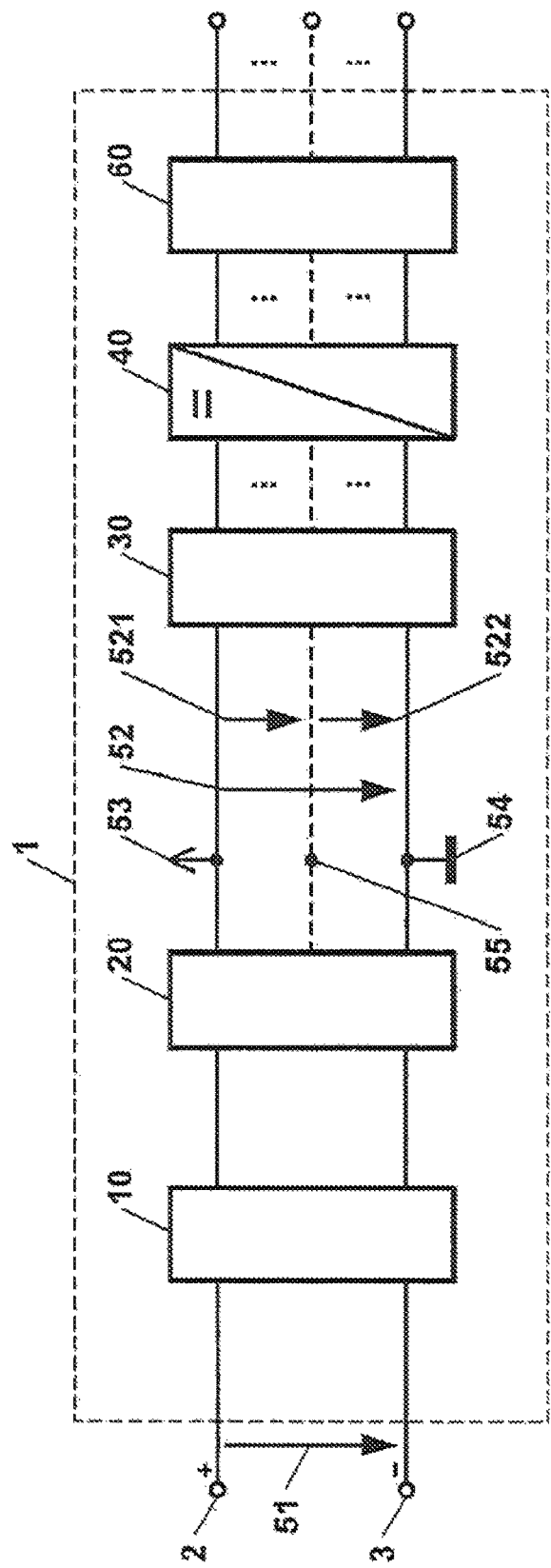
FIG. 2 shows a schematic diagram of a voltage conversion system with DC input.
Figure 3:
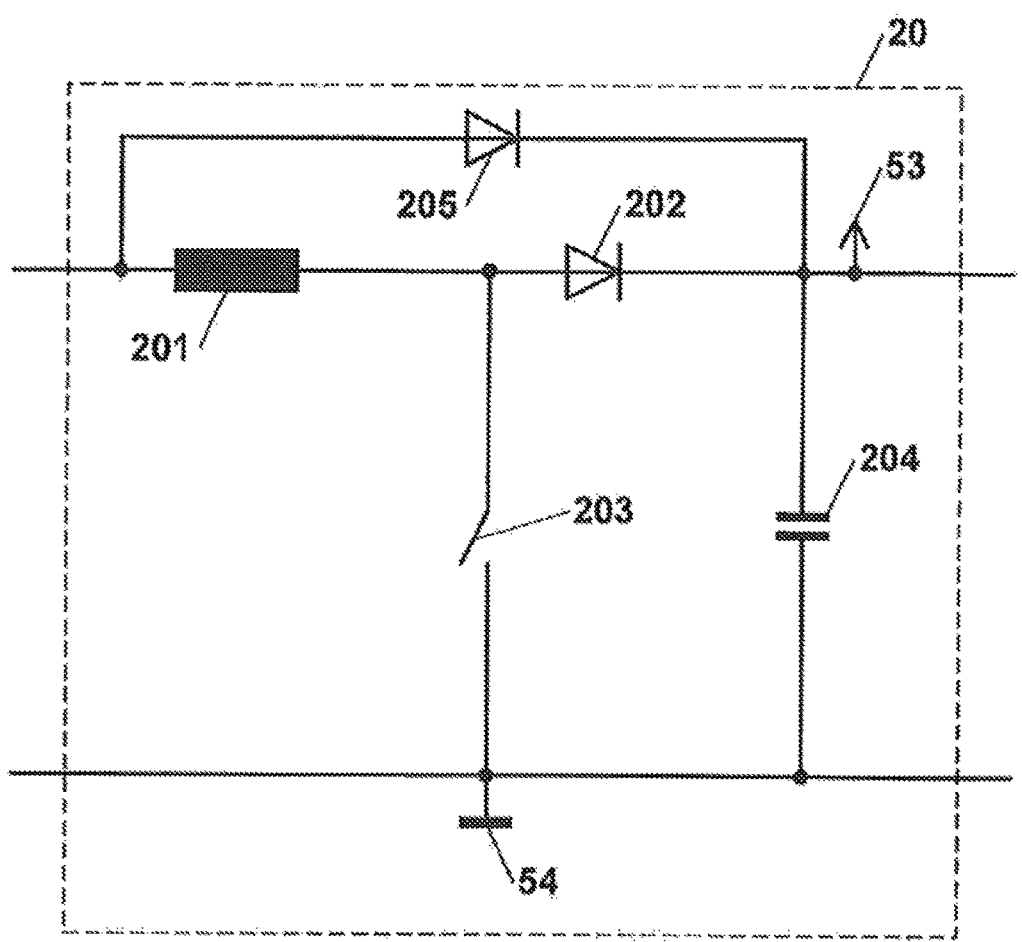
FIG. 3 shows a schematic diagram of a step-up converter as voltage converter in a positive conduction path.
Figures 4A, 4B, 4C, 4D, 4E, 4F:
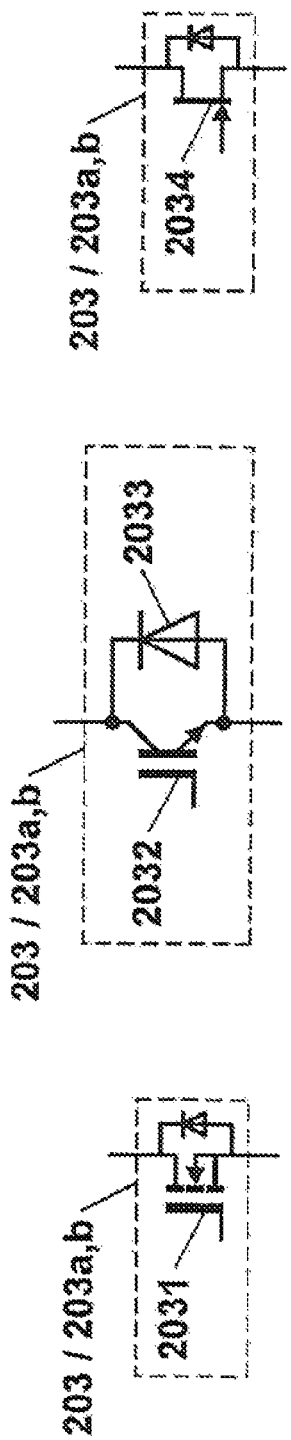
FIGS. 4a to 4f show schematic diagrams of semiconductor switches as switches.
Figure 9:
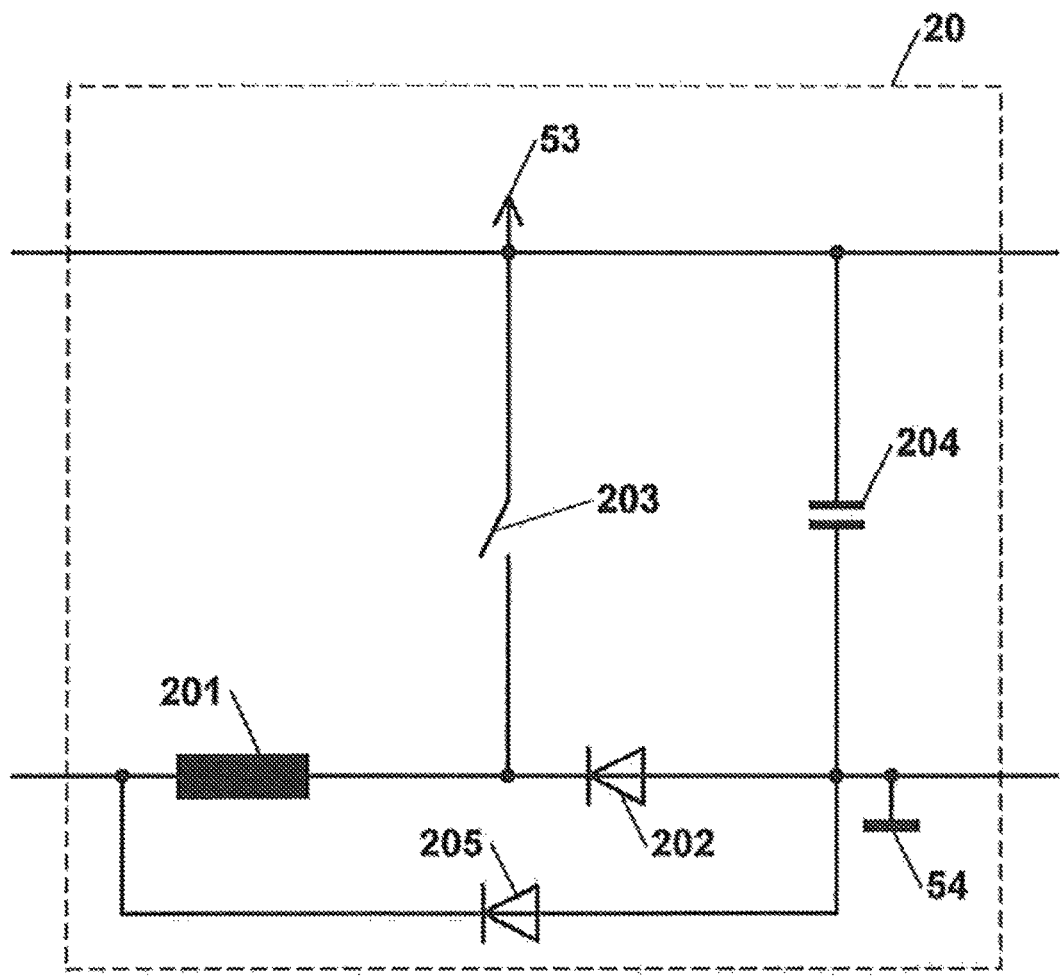
FIG. 9 shows a schematic diagram of a step-up converter as voltage converter in a negative conduction path.
Figure 11:
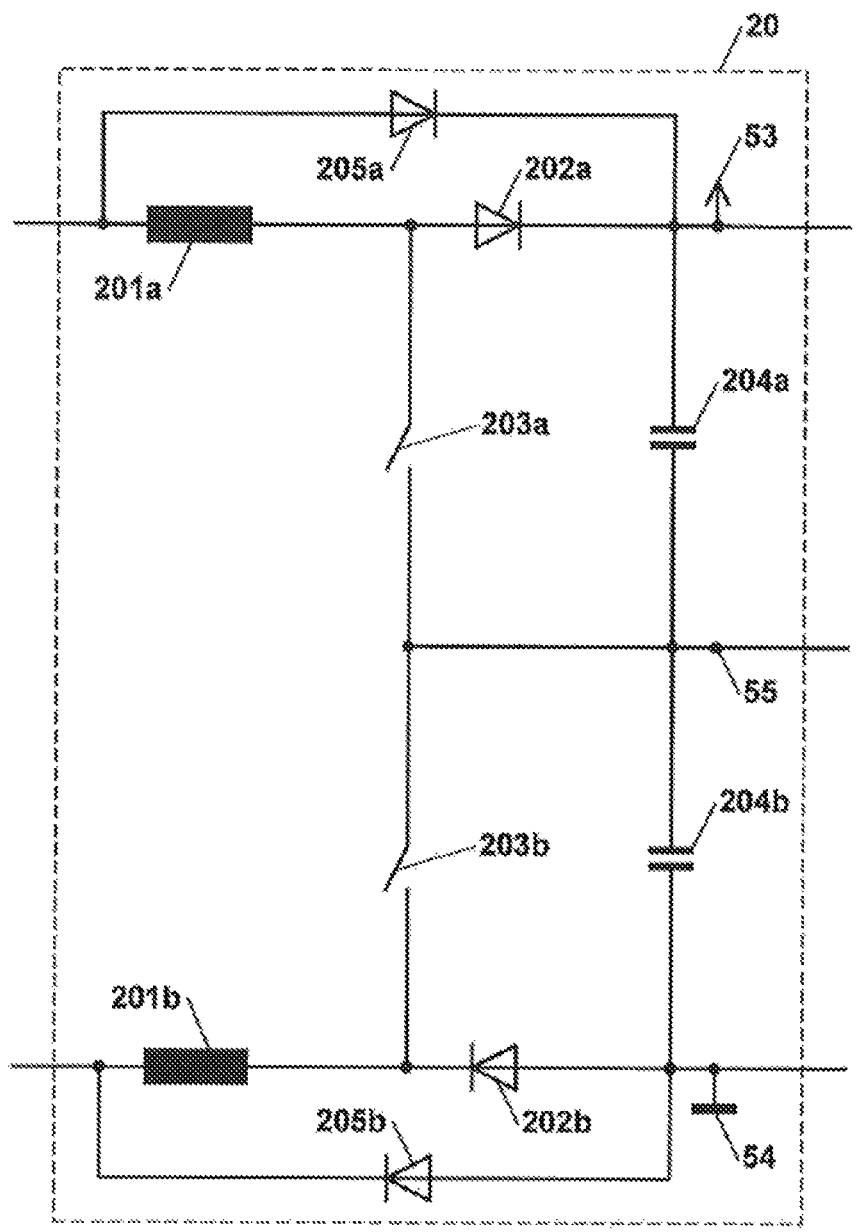
FIG. 11 shows a schematic diagram of a symmetrical step-up converter as symmetrical voltage converter.

In the case of a multi-stage voltage conversion system 1 with DC input, which is shown in greater detail in FIG. 2, when using a step-up converter as voltage converter 20, the embodiments of which are shown in greater detail in FIG. 3, FIG. 9 and FIG. 11, the switch 203/203a,b must be protected against a reverse current flow or a voltage applied backwards, particularly if the voltage converter 20 forms one of the first stages in the overall voltage conversion system 1 and no other stage can prevent a polarity reversal of the input voltage beforehand. A reverse current flow must be prevented in particular in the case of the semiconductor switches which are shown in greater detail in FIG. 4 and which have a parasitic body diode or a freewheeling diode. This applies, inter alia, to the MOSFETs 2031 and 2037, the IGBT 2032 with the freewheeling diode 2033, or the JFET 2034 with the parasitic body diode. A short-circuit current that is not sufficiently limited by the choke 201 of the voltage converter 20 can flow through these diodes, and a fuse in a typical input stage 10 is unable to shut off said current in time. A voltage applied backwards across the switch 203/203a,b must be prevented for all switches that are unable to block backward voltages, for example the IGBT 2035 without an additional freewheeling diode.

The DC link stage 30 of the voltage conversion system 1, in the case where this is a voltage DC link stage, is already protected against reverse polarity by the freewheeling diode 202/202a,b and the bypass diode 205/205a,b, if present. A main voltage converter 40 of the voltage conversion system 1, which, depending on the type, converts the input voltage into an AC voltage or a DC voltage in a galvanically coupled or galvanically isolated embodiment, is likewise protected against reverse polarity by the freewheeling diodes 202/202a,b and the bypass diodes 205/205a,b of the voltage converter 20. Further components arranged on the secondary side, such as for example an output filter stage 60, are usually not adversely affected by a reverse-polarity input voltage, so that no destruction of components is to be expected there.

Figure 1A:
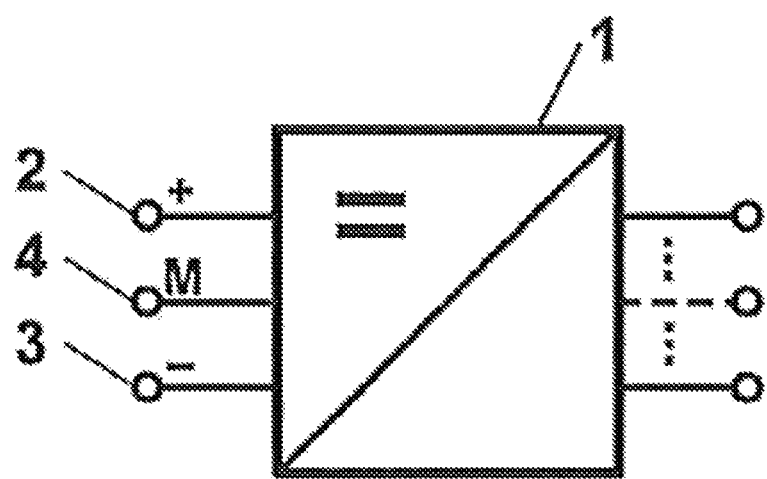
FIG. 1a shows a schematic diagram of a voltage conversion system with DC input and an input-side middle DC potential input.
Figure 2A:
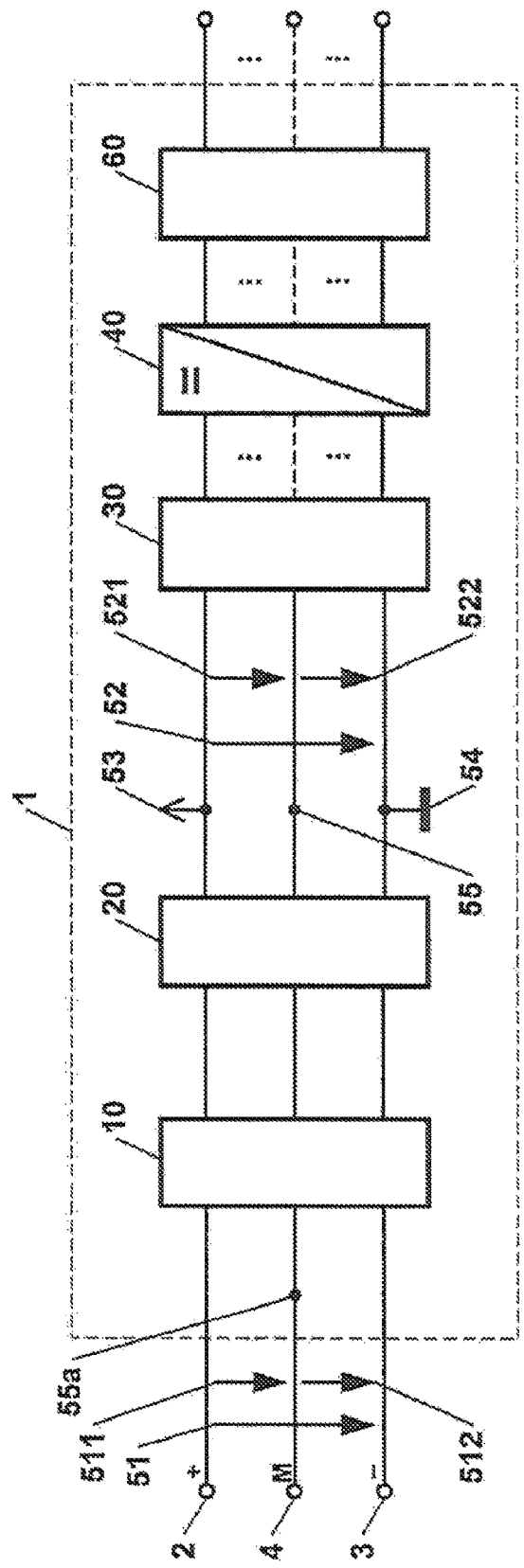
FIG. 2a shows a schematic diagram of a voltage conversion system with DC input and an input-side middle DC potential input.

In one embodiment, which is shown in FIG. 1a and FIG. 2a, a further potential M may be present on an input terminal 4 at the input of the voltage conversion system with DC input 1, which further potential is arranged in voltage terms as a middle potential 55a between the two potentials of the input terminals 2 and 3 and can assume for example half the potential between the two potentials of the input terminals 2 and 3 and thus the middle potential 55. In this case, too, the correct polarity of the two input voltages must be ensured, and the components must be protected against destruction in the event of a polarity reversal of one or both input voltages.

Figure 5A:
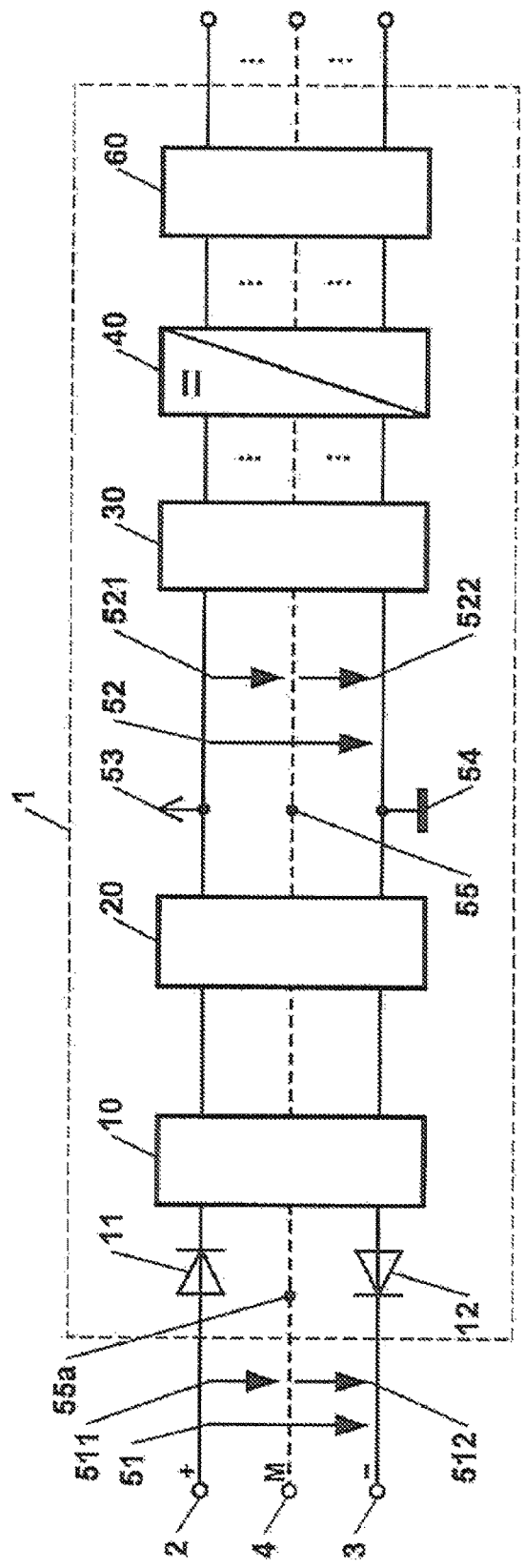
FIGS. 5a and 5b show schematic diagrams of voltage conversion systems.
Figure 5B:
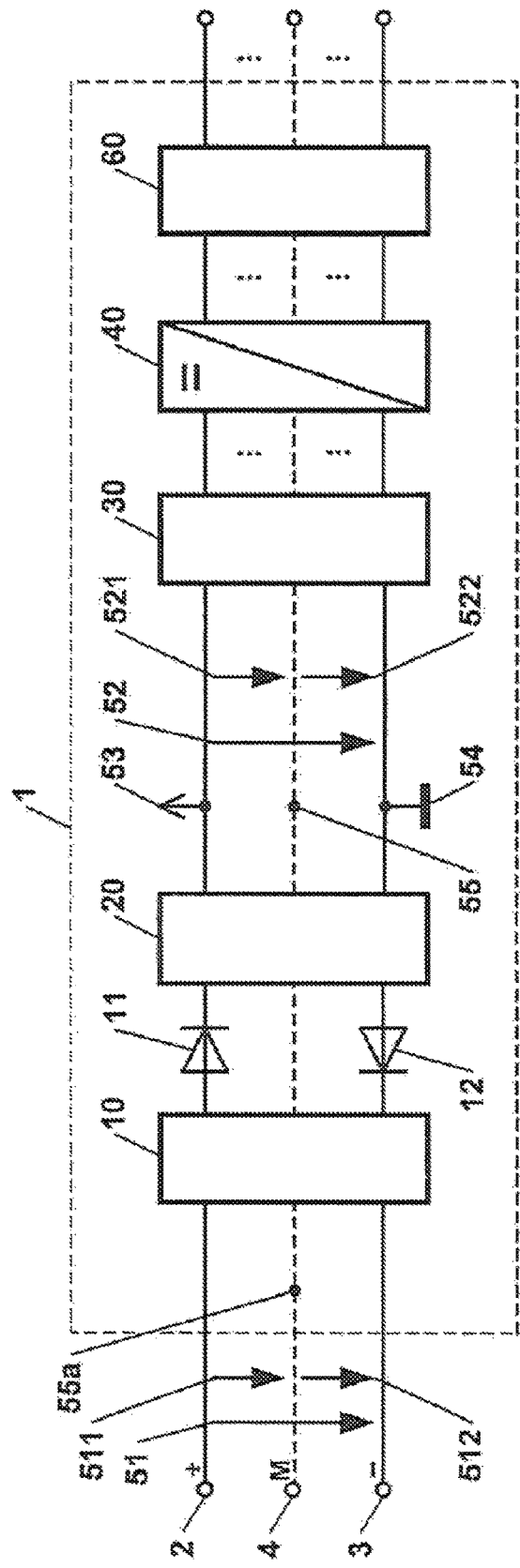

In order to take account of a reversed connection of the input voltage 51 at the input terminals 2 and 3, one or even two diodes 11 and 12 may be introduced into the lines for example in the input region optionally in front of the input stage 10, as shown in FIG. 5a, or behind the latter, as shown in FIG. 5b. The input stage 10 may include, inter alia, fuses, filter elements and surge protection elements. At least one or both diodes 11 and 12 together, which are introduced into the circuit with a suitable current flow direction, can prevent a reverse current flow and a reverse input voltage 51 if the input potentials on the input terminals 2 and 3 are reversed, which can lead to components being destroyed. Both diodes 11 and 12 are typically used when the embodiment of FIG. 2a is used and when the middle potential 55a is present on the input terminal 4. Then, both diodes 11 and 12 together can prevent any of the two partial input voltages 511 and 512 from being wrongly switched round.

However, introducing the diodes 11 and/or 12 into an input branch of the voltage conversion system 1 leads to said diodes 11 and/or 12 being located in the power path of the voltage conversion system 1 and thus continuously carrying the entire load current. Due to the current flow through a diode, a voltage drop is brought about at the latter, which leads to electrical losses at the diode. It is therefore advantageous to keep the reverse polarity protection out of the main power path or load current path in order to reduce the electrical losses.

One possibility for this is to introduce a reverse polarity protection diode 206 into the switch branch 209 of the voltage converter 20, where it carries a lower effective current due to the timed operation of the switch 203. Lower electrical losses are thus produced. The advantageous arrangement of the reverse polarity protection diode 206 in relation to the switch 203 may depend on the types used and the actuation thereof.

Figure 6:
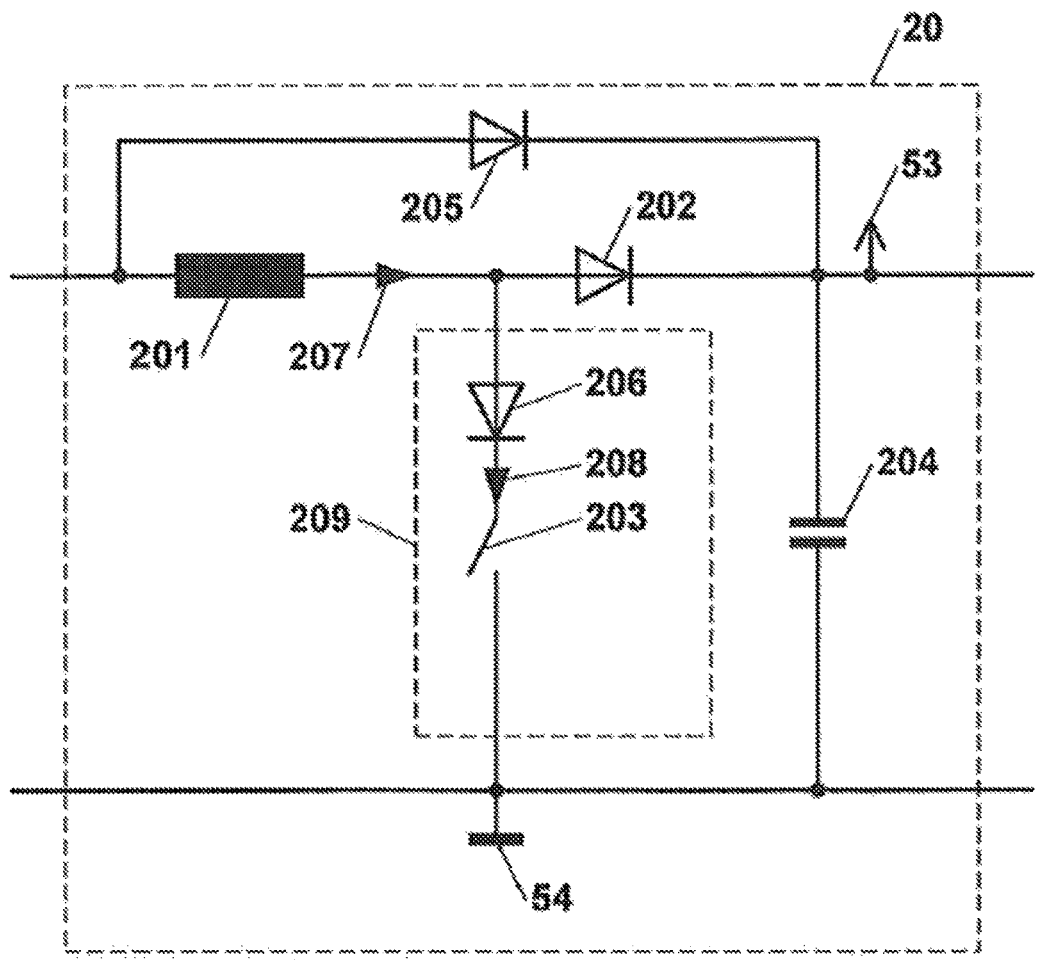
FIG. 6 shows a schematic diagram of a step-up converter as voltage converter in a positive conduction path with a reverse polarity protection diode.

A first embodiment will now be explained in greater detail. Here, the reverse polarity protection diode 206 is introduced into a step-up converter as voltage converter 20 in the positive line branch of FIG. 3 above the switch 203 such that the anode terminal, as shown in FIG. 6, is connected to the node point of the choke 201 and the freewheeling diode 202 of the step-up converter as voltage converter 20, and the cathode terminal is connected to the switch 203. By arranging an additional element in this way in the switch branch 209 of the step-up converter as voltage converter 20, this has no effect on the actuation circuit of the switch 203 when a voltage is applied to the control terminal thereof towards the ground potential 54, such as for example in a MOSFET 2031 of an N-channel type or in an IGBT 2032/2035.

The switch 203 is configured to close a circuit path between input terminals of the voltage converter 20. The circuit path extends from a first input terminal of the voltage converter 20, via the choke 201 and the switch branch 209, to a second input terminal of the voltage converter 20.

Figure 6A:
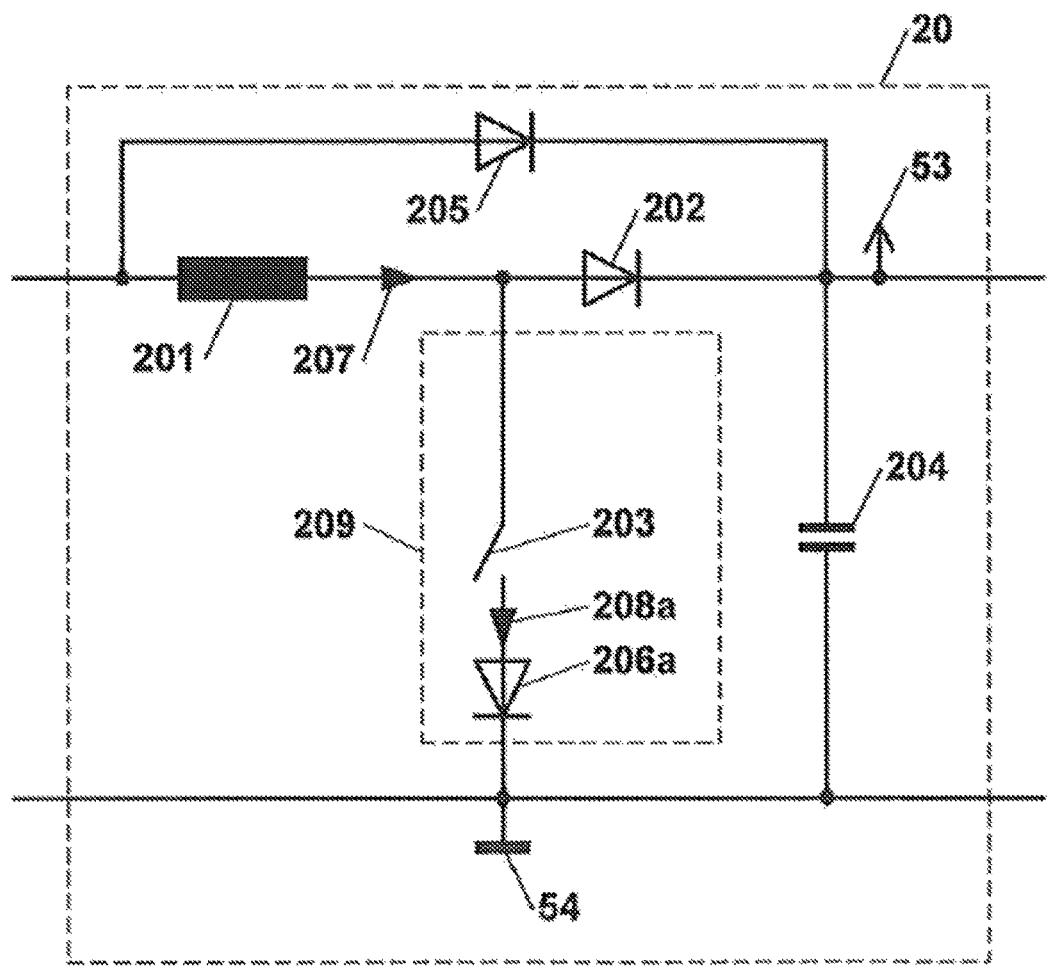
FIG. 6a shows a schematic diagram of a step-up converter as voltage converter in a positive conduction path with a reverse polarity protection diode.

In the case of semiconductor types which are not actuated towards the ground potential 54, the reverse polarity protection diode 206a may optionally also be introduced below the switch 203, wherein, as shown in FIG. 6a, the cathode terminal can then be connected to the node point of the ground potential 54 of the step-up converter as voltage converter 20, and the anode terminal can be connected to the switch 203. In addition, further elements may be introduced into the switch branch 209, for example measuring resistors for detecting a current 208/208a through the switch 203. Introduced into the switch branch 209 of the step-up converter as voltage converter 20, the reverse polarity protection diode 206/206a prevents a reverse current flow through a body diode or freewheeling diode of the switch 203 in the event of a reversed input voltage 51. Furthermore, it also accepts the backward voltage in the switch branch 209 that is caused by the polarity reversal and that otherwise may destroy the switch 203 if the latter does not include a body diode or freewheeling diode and is unable to block backward voltages. The diodes 11 and/or 12 in the input branch can thus be omitted.

Figure 7:
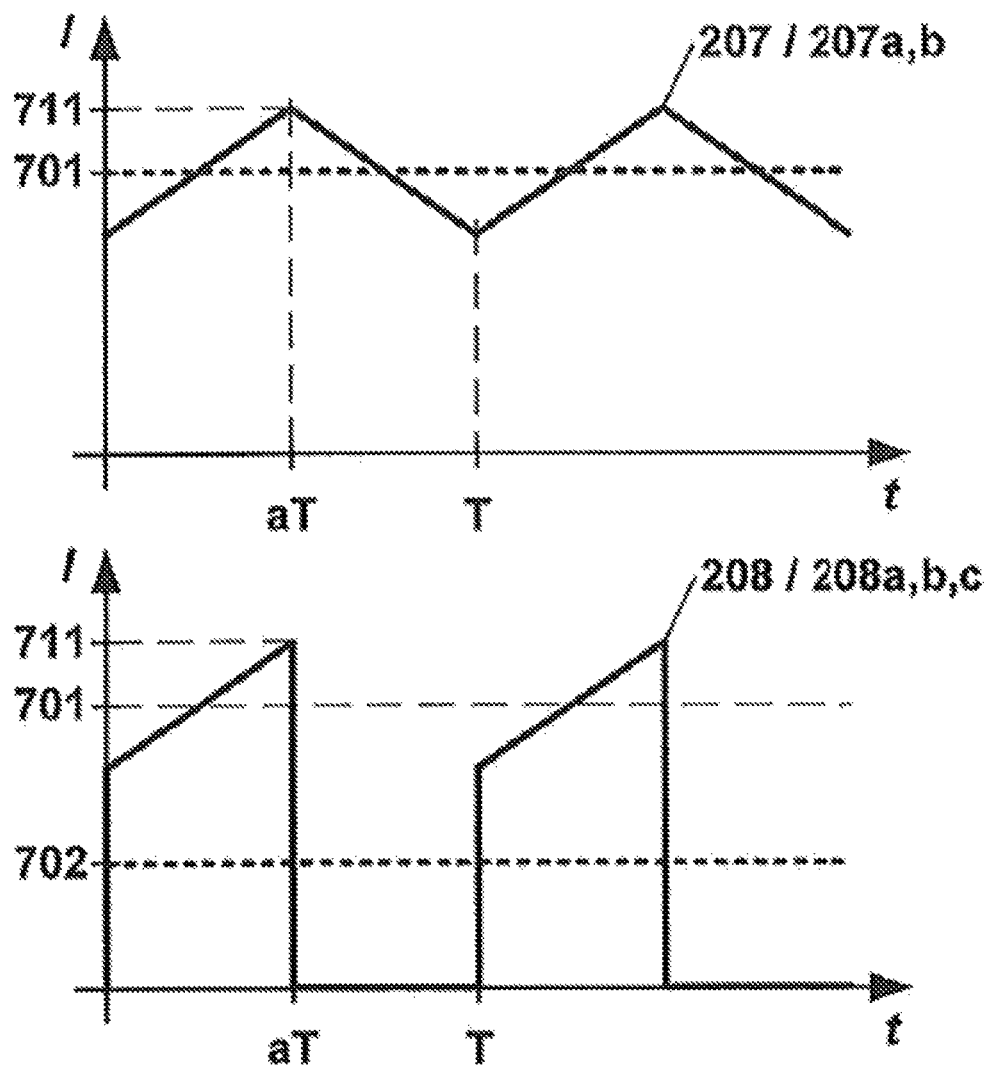
FIG. 7 shows schematic diagrams of current waveforms through a choke and a switch of a step-up converter as voltage converter.
Figure 8:
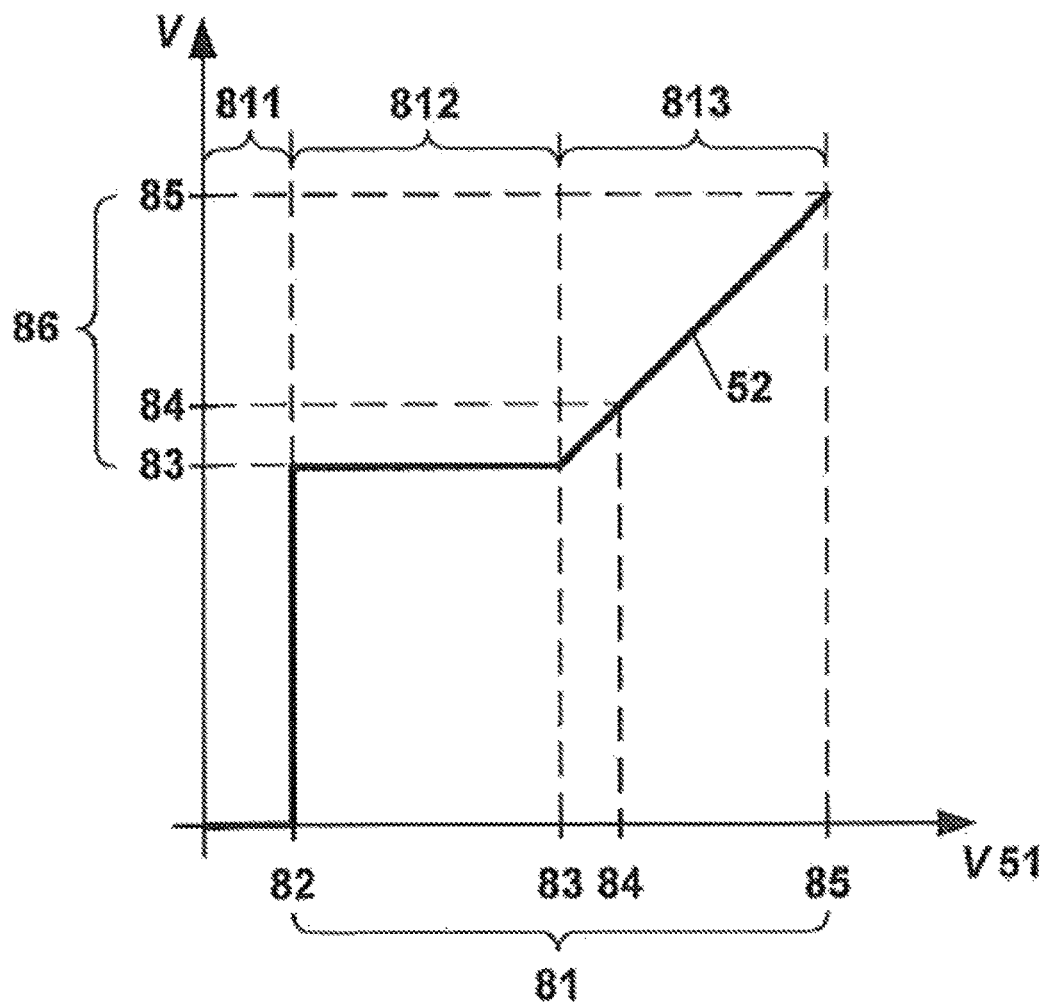
FIG. 8 shows a schematic diagram of a voltage characteristic for a voltage conversion system and a method for operating a voltage conversion system.

The arrangement of the reverse polarity protection diode 206/206a is advantageous for reducing electrical losses since the current 208/208a flows through the reverse polarity protection diode 206/206a only when the switch 203 of the step-up converter as voltage converter 20 is closed. The current therefore does not flow continuously. In this case, as shown in FIG. 7, the pulsed current 208/208a reaches a much lower effective value 702 than the current 207 through the choke 201, the effective value 701 of which corresponds to that of the input current and reaches the peak value 711. As a result, reduced electrical losses occur in the reverse polarity protection diode 206/206a compared to the variant with the diodes 11 and/or 12 in the input branch. The closer the input voltage 51 and the stepped-up DC link voltage 83 to be achieved, the lower the electrical losses in the reverse polarity protection diode 206/206a. A duty cycle a of the switch 203 of the step-up converter as voltage converter 20 runs towards zero and the switch 203 is switched on for increasingly shorter times, as a result of which the effective value 702 or mean value of the current 208/208a through the reverse polarity protection diode 206/206a also runs towards zero. Minimal electrical losses through the reverse polarity protection diode 206/206a occur when the step-up converter as voltage converter 20 is not in operation and the effective value 702 or mean value of the current 208/208a through the reverse polarity protection diode 206/206a is zero. The electrical output voltage of the voltage converter 20 is supported by a capacitor 204.

Figure 10:
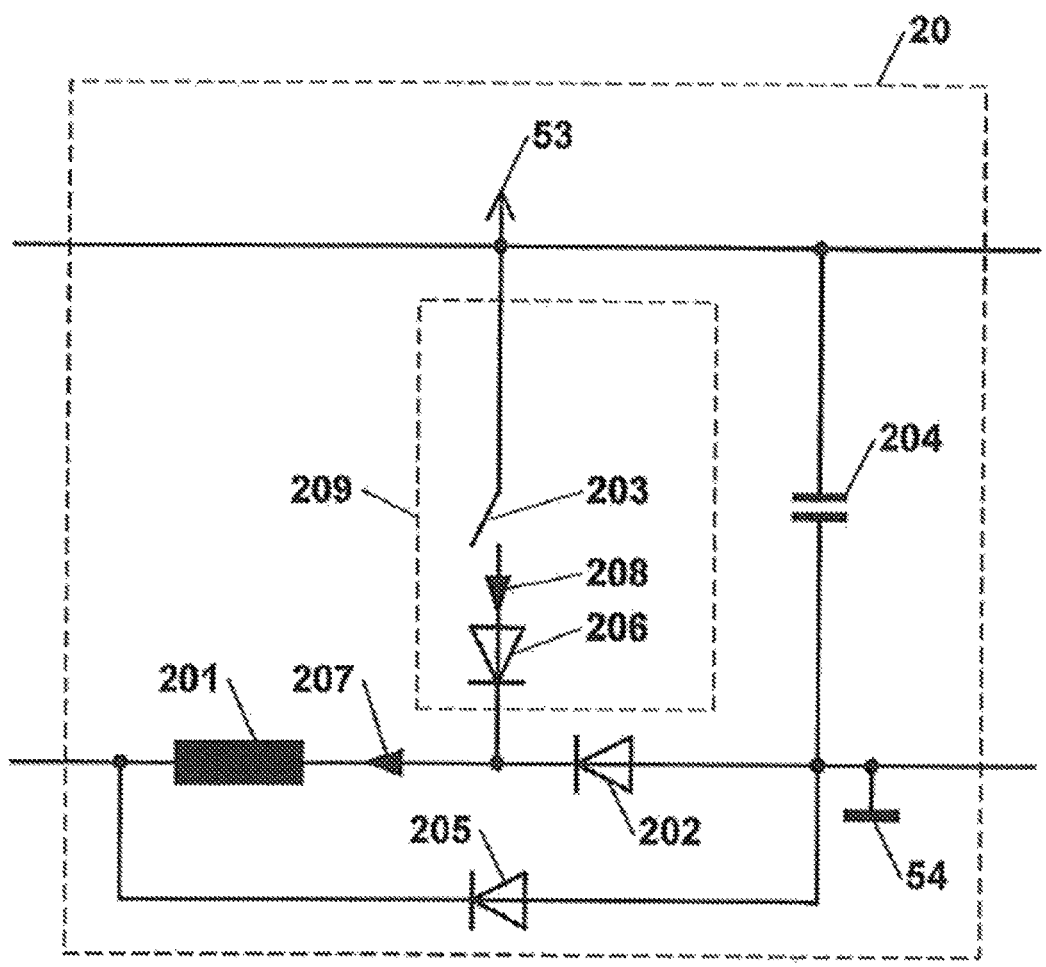
FIG. 10 shows a schematic diagram of a step-up converter as voltage converter in a negative conduction path with a reverse polarity protection diode.

A second embodiment will now be explained in greater detail. In this case, the reverse polarity protection diode 206 is introduced into a step-up converter as voltage converter 20 in the negative line branch of FIG. 9, below the switch 203, such that the cathode terminal, as shown in FIG. 10, is connected to the node point of the choke 201 and the freewheeling diode 202 of the step-up converter as voltage converter 20, and the anode terminal is connected to the switch 203. By arranging an additional element in this way in the switch branch 209, this has no effect on an actuation circuit of the switch 203 when a voltage is applied to the control terminal thereof towards the positive potential 53, such as for example in a MOSFET 2037 of a P-channel type.

The switch 203 is configured to close a circuit path between input terminals of the voltage converter 20. The circuit path extends from a first input terminal of the voltage converter 20, via the choke 201 and the switch branch 209, to a second input terminal of the voltage converter 20.

Figure 10A:
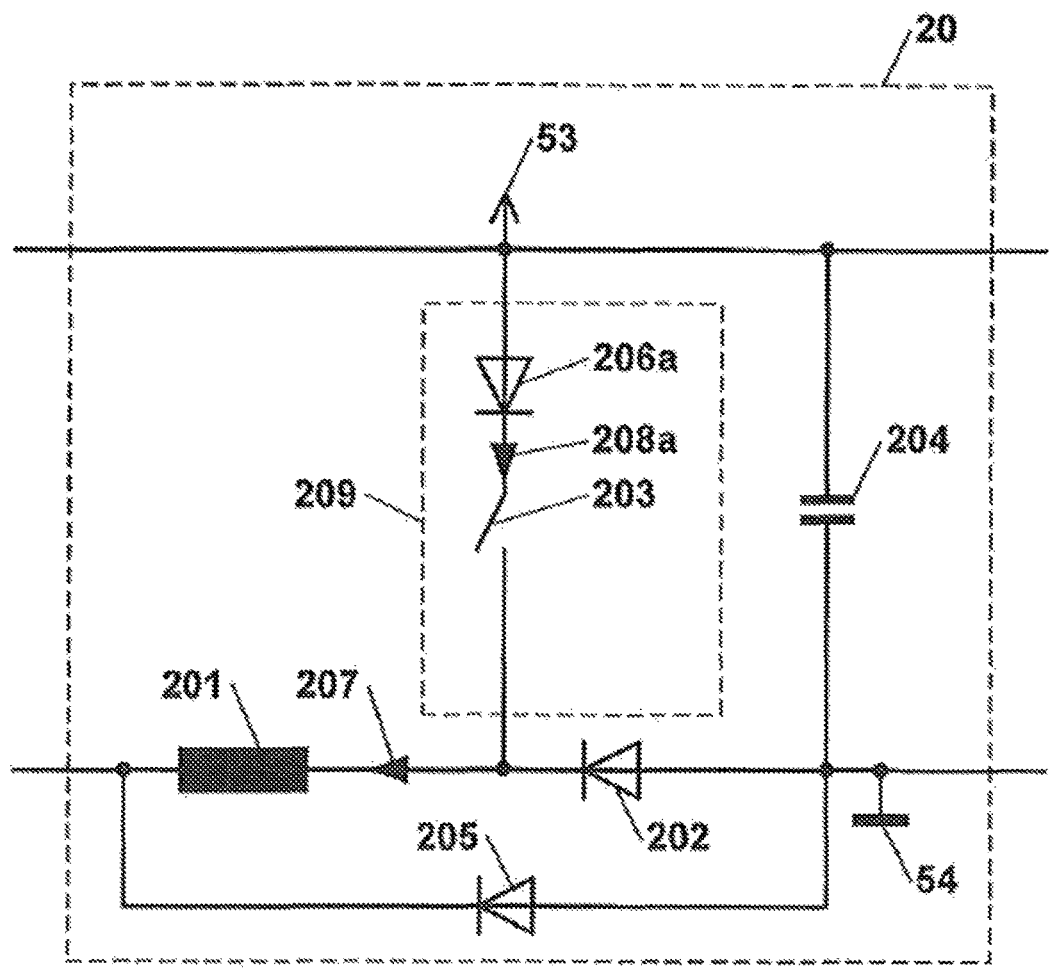
FIG. 10a shows a schematic diagram of a step-up converter as voltage converter in a negative conduction path with a reverse polarity protection diode.

In the case of semiconductor switches which are not actuated towards the positive potential 53, the reverse polarity protection diode 206a may optionally also be introduced above the switch 203, wherein, as shown in FIG. 10a, the anode terminal is then connected to the node point of the positive potential 53 of the step-up converter as voltage converter 20, and the cathode terminal is connected to the switch 203. In addition, further elements may be introduced into the switch branch 209, for example measuring resistors for detecting a current 208/208a through the switch 203. The electrical output voltage of the voltage converter 20 is supported by a capacitor 204.

This results in the same operating principle with respect to reversed input potentials and the same advantages in terms of the electrical losses with regard to the current flowing through the reverse polarity protection diode as already described with regard to the first embodiment.

Figure 12:
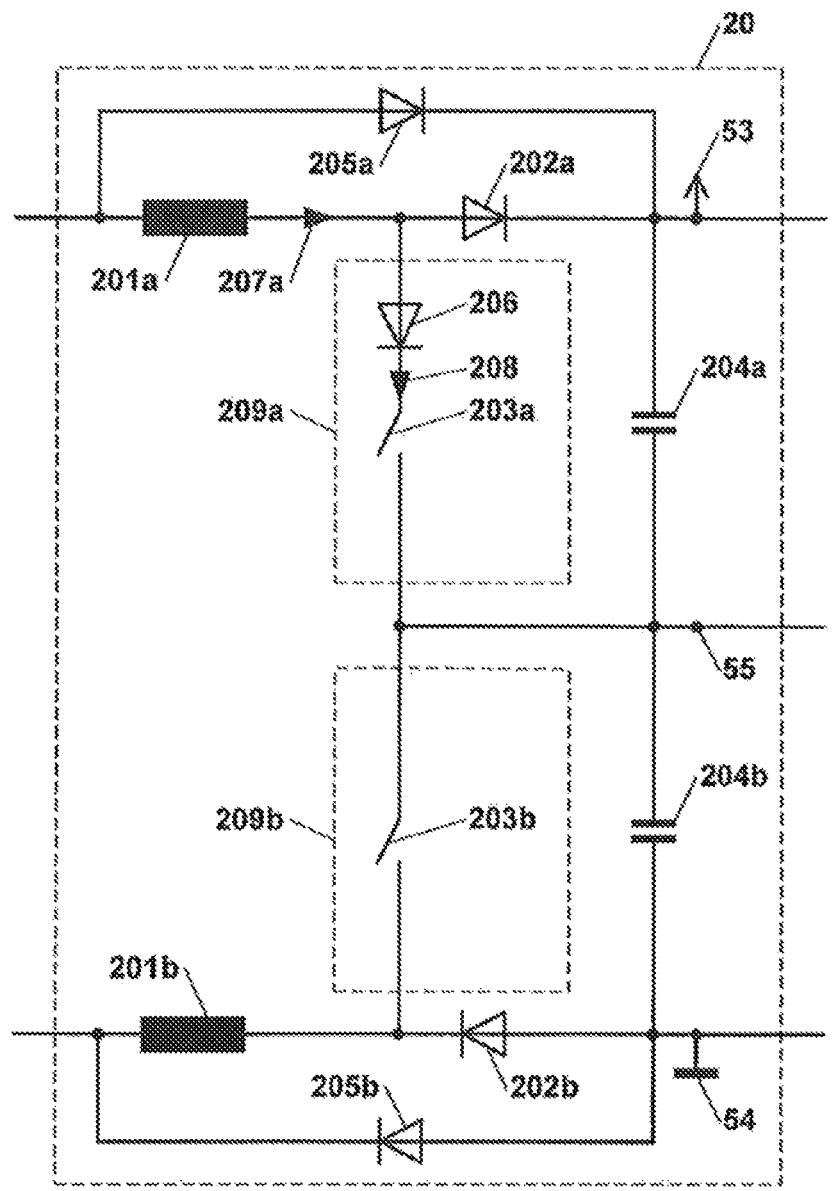
FIG. 12 shows a schematic diagram of a symmetrical step-up converter as symmetrical voltage converter with a reverse polarity protection diode.

A third embodiment will now be explained in greater detail. In this case, the reverse polarity protection diode 206 is introduced into a symmetrical step-up converter as symmetrical voltage converter 20, as shown in FIG. 11, above the switch 203a, such that the anode terminal, as shown in FIG. 12, is connected to the node point of the choke 201a and the freewheeling diode 202a of the step-up converter as voltage converter 20, and the cathode terminal is connected to the switch 203a. By arranging an additional element in this way in the upper switch branch 209a, this has no effect on the actuation circuit of the switch 203a when a voltage is applied to the control terminal thereof towards the middle potential 55, such as for example in a MOSFET 2031 of an N-channel type or in an IGBT 2032/2035.

The switches 203a and 203b are configured to close a circuit path between input terminals of the voltage converter 20. The circuit path extends from a first input terminal of the voltage converter 20, via the choke 201a, the switch branch 209a, the switch branch 209b and the choke 201b, to a second input terminal of the voltage converter 20.

Figure 12A:
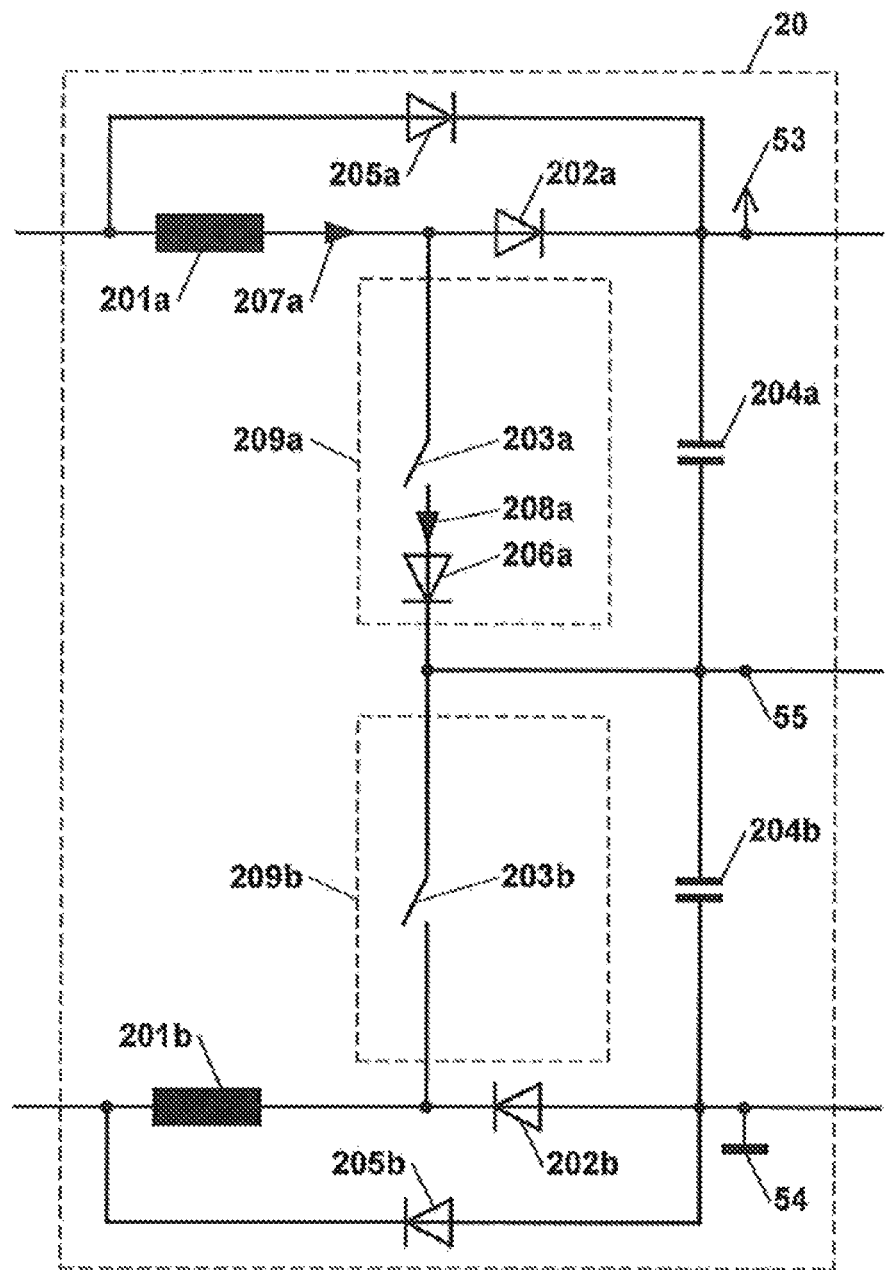
FIGS. 12a to 12c show schematic diagrams of symmetrical step-up converters as symmetrical voltage converters with a reverse polarity protection diode.

In the case of semiconductor switches which are not actuated towards the middle potential 55, the reverse polarity protection diode 206a may optionally also be introduced below the switch 203a, wherein, as shown in FIG. 12a, the cathode terminal is then connected to the node point of the middle potential 55 of the step-up converter as voltage converter 20, and the anode terminal is connected to the switch 203*a*. In addition, further elements may be introduced into the switch branch 209*a*, for example measuring resistors for detecting the current 208/208*a* through the switch 203.

Figure 12B:
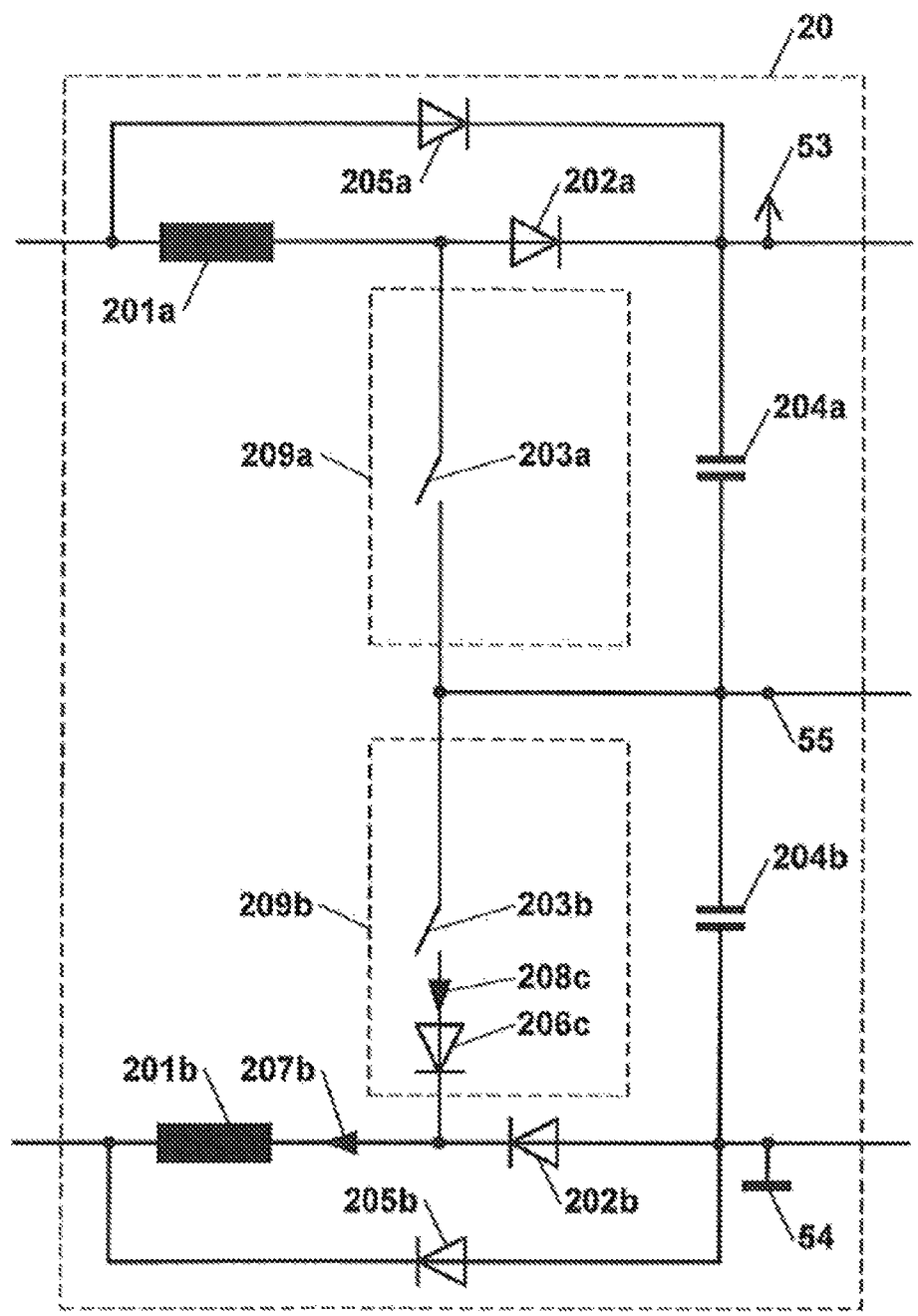
Figure 12C:
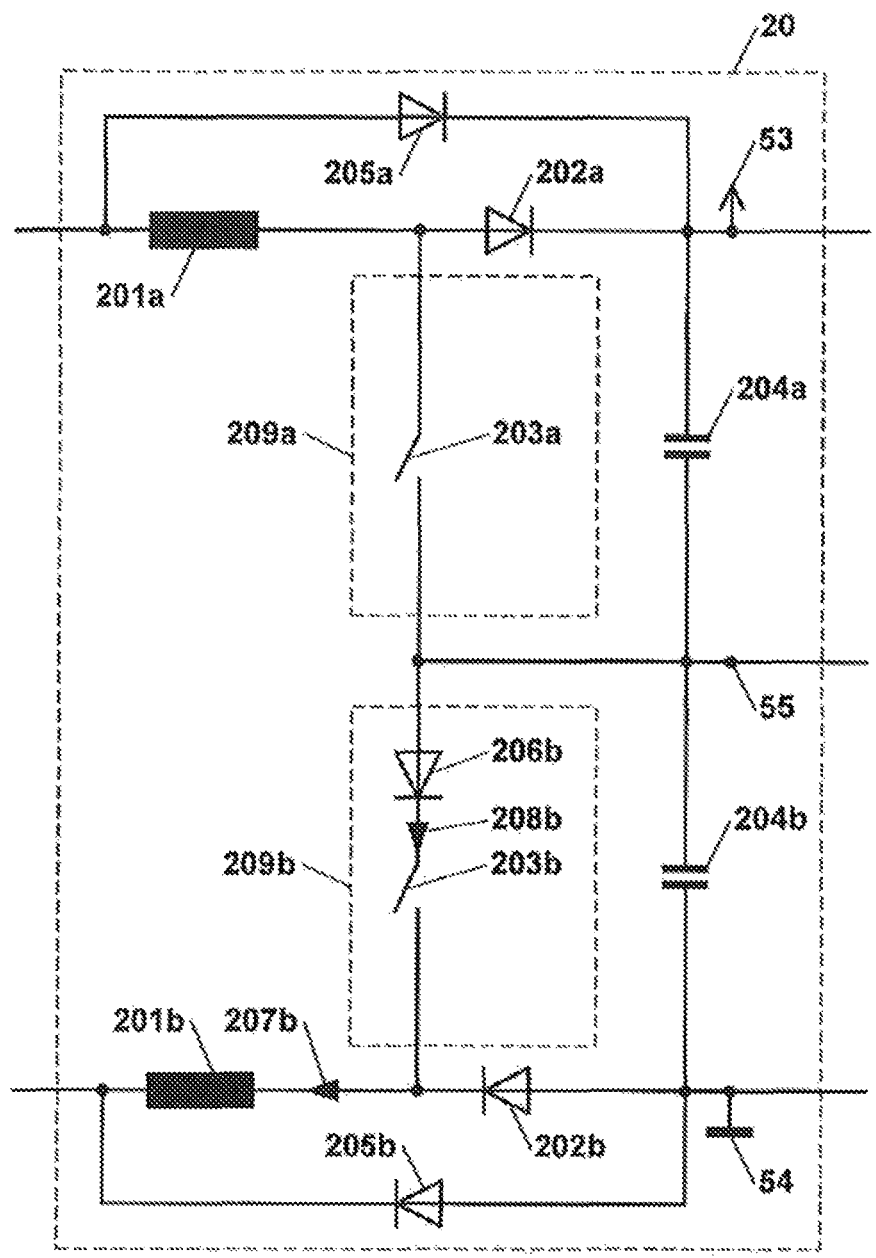

In a manner analogous to the described possibility of introducing the reverse polarity protection diode 206/206*a* into the upper switch branch 209*a* of the symmetrical step-up converter as symmetrical voltage converter 20, it is possible to introduce a reverse polarity protection diode into the lower switch branch 209*b* of the symmetrical step-up converter as symmetrical voltage converter 20. The variant of introducing the reverse polarity protection diode 206*c* below the switch 203*b*, in which the cathode terminal, as shown in FIG. 12*b*, is connected to the node point of the choke 201*b* and the freewheeling diode 202*b* of the step-up converter as voltage converter 20, and the anode terminal is connected to the switch 203*b*, has no effect on the actuation of switches, particularly semiconductor switches, that have a voltage applied to the control terminal thereof towards the middle potential 55. For semiconductor switches which are not actuated towards the middle potential 55, it is possible to introduce the reverse polarity protection diode 206*b* above the switch 203*b*, as shown in FIG. 12*c*, wherein the anode terminal is connected to the middle potential 55 of the step-up converter as voltage converter 20, and the cathode terminal is connected to the switch 203*b*. In addition, further elements may be introduced into the switch branch 209*b*, for example measuring resistors for detecting the current 208*b*/208*c* through the switch 203*b*. The electrical output voltage of the voltage converter 20 is supported by a capacitor 204*a* and a capacitor 204*b*.

This results in the same operating principle with respect to reversed input potentials, wherein introduction into one of the two switch branches 209*a* or 209*b* may be sufficient for the symmetrical step-up converter as symmetrical voltage converter 20, and the same advantages in terms of the electrical losses with regard to the current flowing through the reverse polarity protection diode as already described with regard to the first embodiment.

Figure 13:
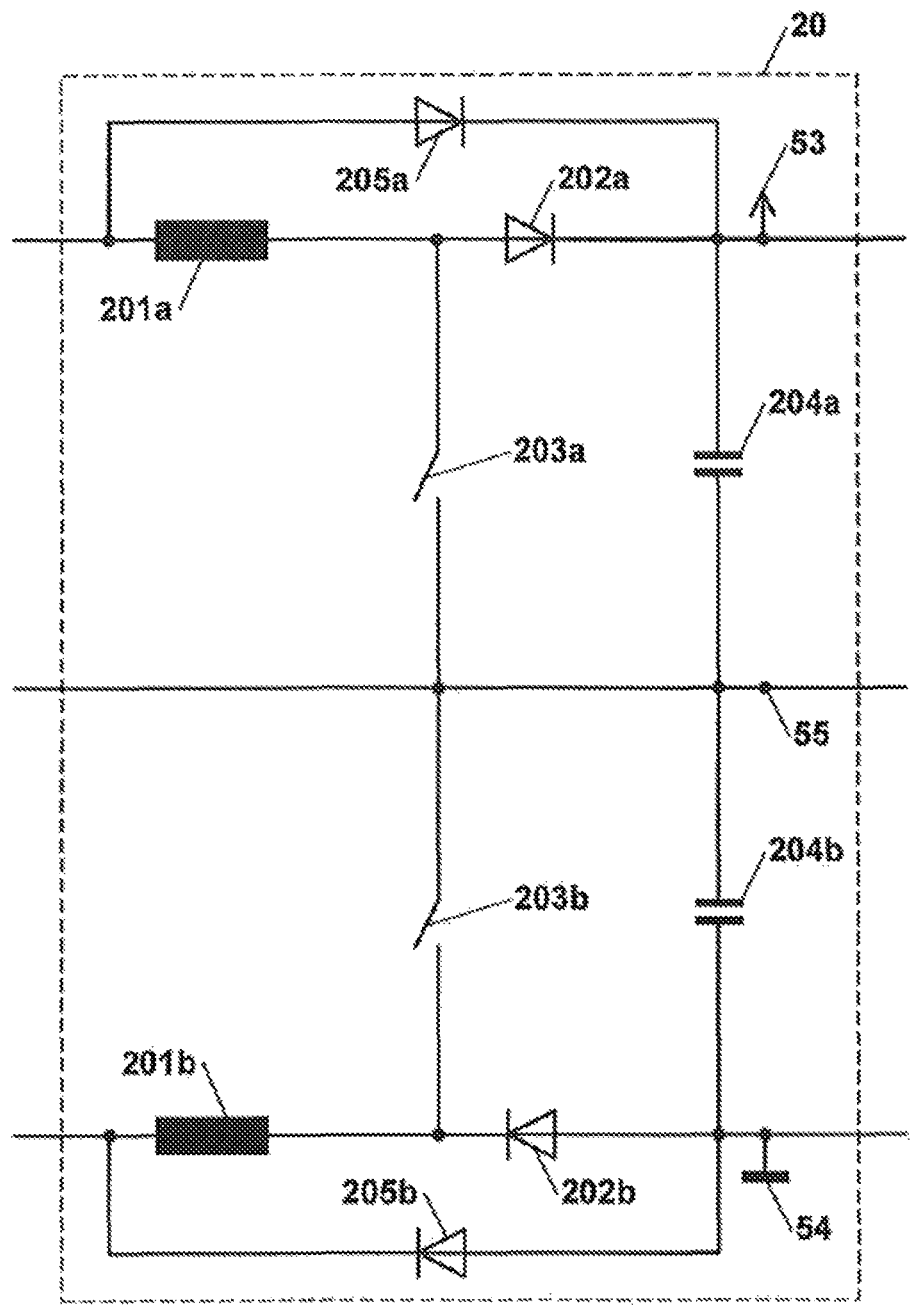
FIG. 13 shows a schematic diagram of a symmetrical step-up converter as symmetrical voltage converter with an input-side middle potential input.
Figure 14:
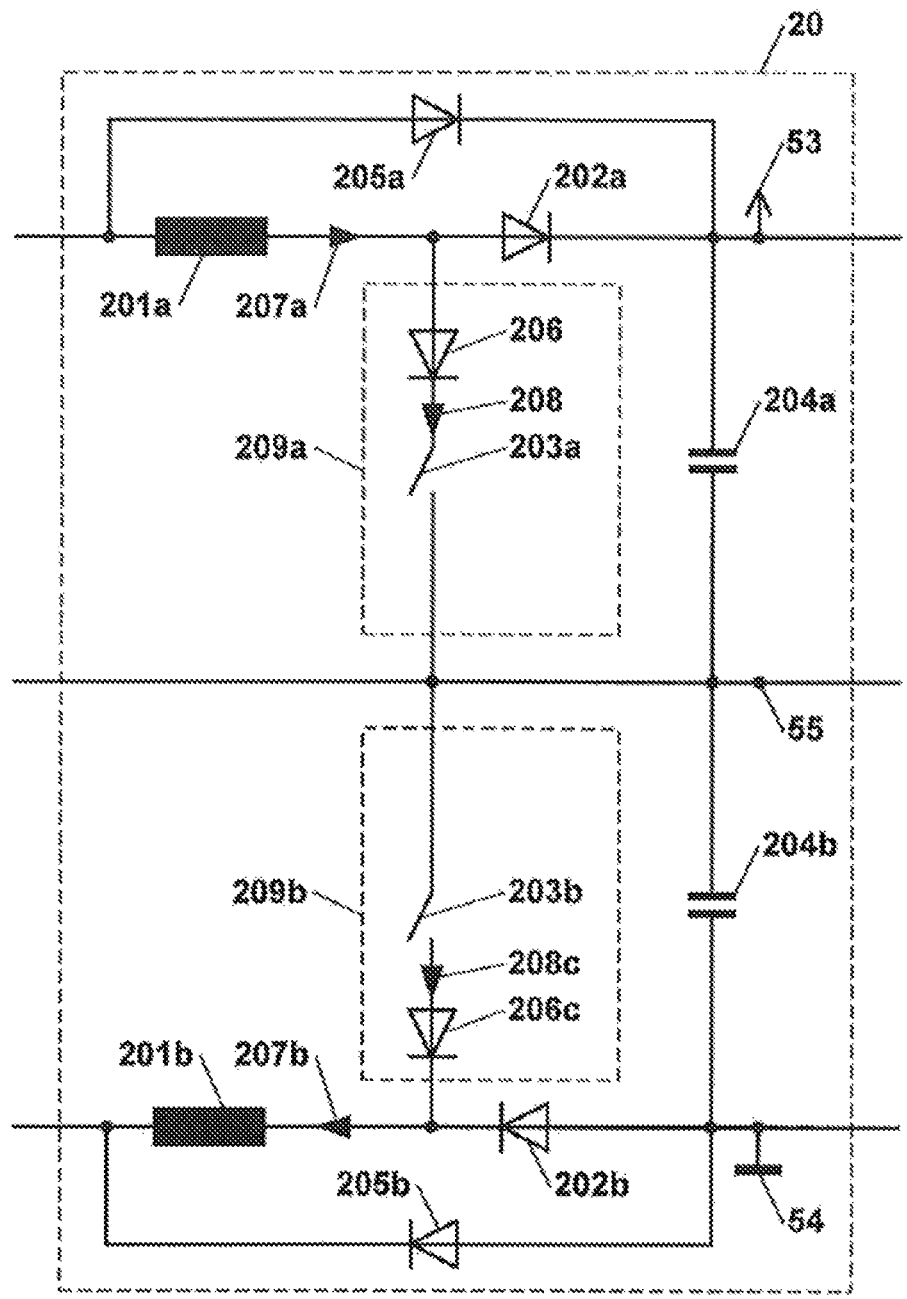
FIG. 14 shows a schematic diagram of a symmetrical step-up converter as symmetrical voltage converter with an input-side middle potential input and with a reverse polarity protection diode.

A fourth embodiment will now be explained in greater detail. When using a symmetrical step-up converter as symmetrical voltage converter 20 with middle potential 55 at the input as shown in FIG. 13, said middle potential may also be available, as shown in FIG. 1*a* and FIG. 2*a*, on the input terminal 4 at the input of a voltage conversion system 1 with DC input, so that two partial input voltages 511 and 512 can be connected in series. In this case, a polarity reversal for the two partial input voltages 511 and 512 should be ruled out. To this end, a reverse polarity protection diode 206 may be introduced in the upper switch branch 209*a* of the symmetrical step-up converter as symmetrical voltage converter 20 with an input-side middle potential 55, and a further reverse polarity protection diode may be introduced in the lower switch branch 209*b*. FIG. 14 shows a variant in which the switches of the upper and lower switch branch are each actuated towards the middle potential 55. In this configuration, the additional reverse polarity protection diode does not affect the actuation circuit of the switches. In this case, the anode terminal of the reverse polarity protection diode 206 in the upper switch branch 209*a* is connected to the node point of the choke 201*a* and the freewheeling diode 202*a* of the section in the positive line branch, and the cathode terminal is connected to the switch 203*a*. In the lower switch branch 209*b*, the reverse polarity protection diode 206*c* is introduced such that the cathode terminal thereof is connected to the node point of the choke 201*b* and the freewheeling diode 202*b* of the section in the negative line branch, and the anode terminal is connected to the switch 203*b*.

The switch 203*a* is configured to close a circuit path between input terminals of the voltage converter 20. The circuit path extends from a first input terminal of the voltage converter 20, via the choke 201*a* and the switch branch 209*a*, to a second input terminal of the voltage converter 20. The switch 203*b* is configured to close a further circuit path between input terminals of the voltage converter 20. The further circuit path extends from a third input terminal of the voltage converter 20, via the choke 201*b* and the switch branch 209*b*, to the second input terminal of the voltage converter 20.

Figure 14A:
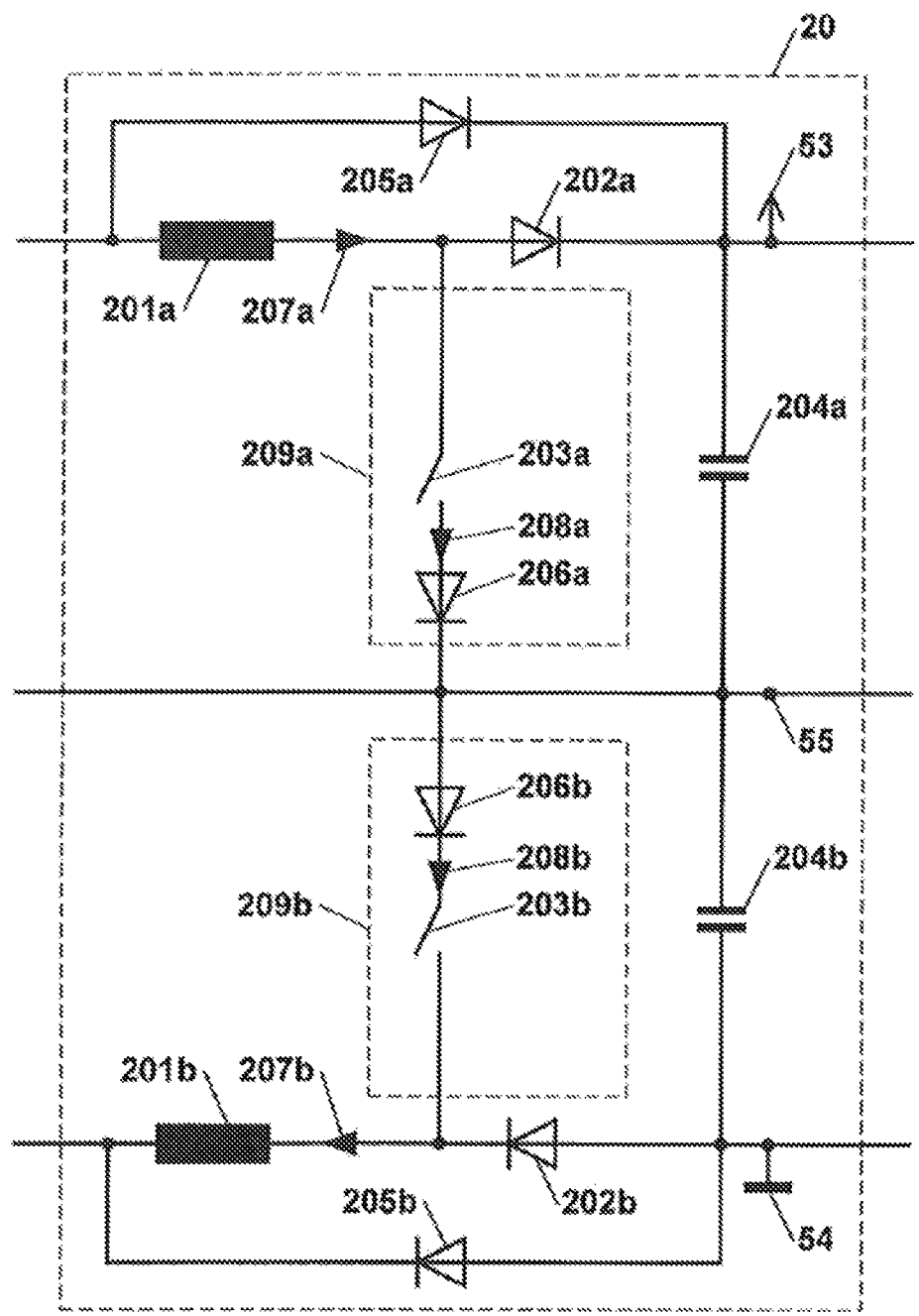
FIGS. 14a to 14c show schematic diagrams of symmetrical step-up converters as symmetrical voltage converters with an input-side middle potential input and with a reverse polarity protection diode.
Figure 14B:
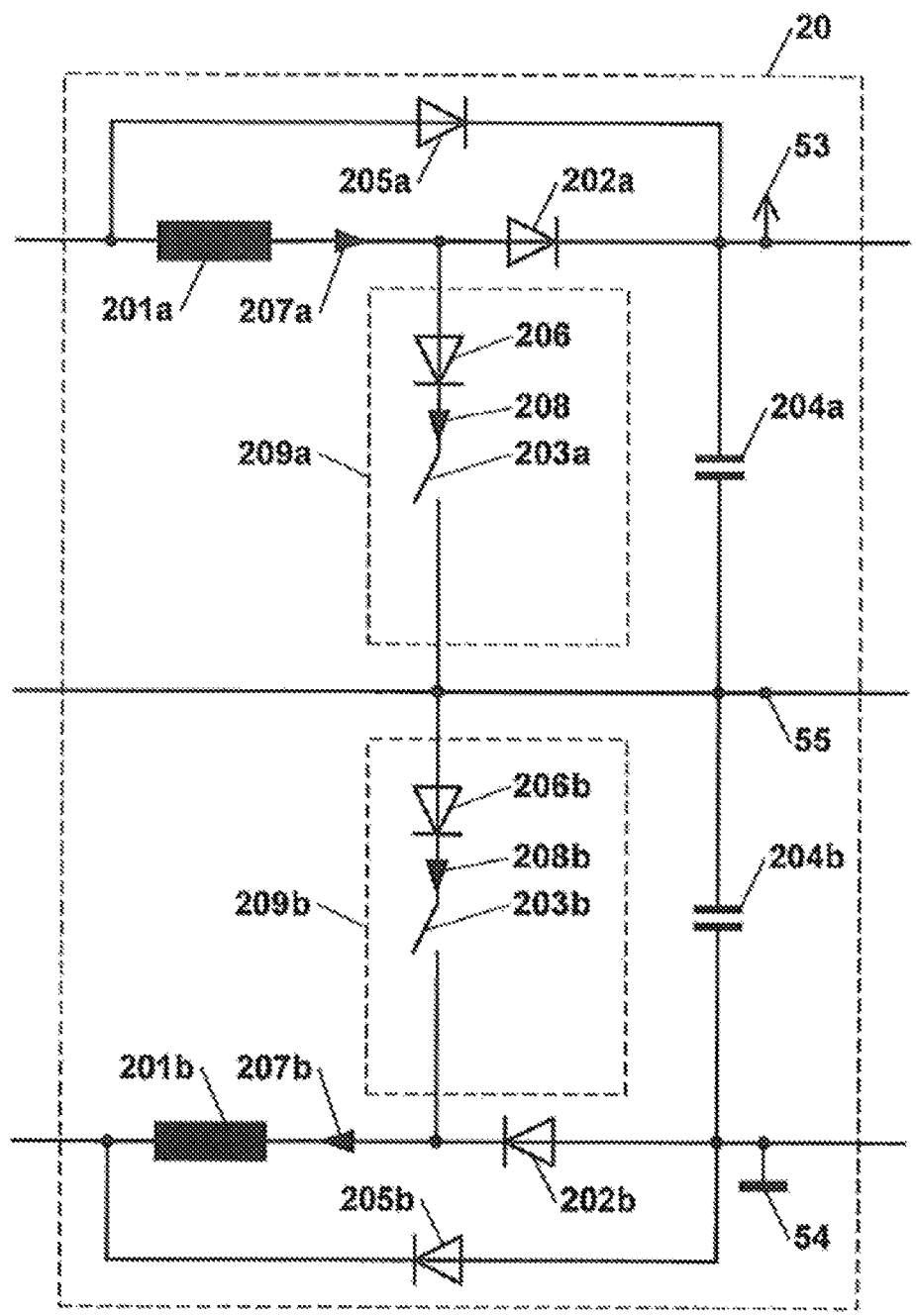
Figure 14C:
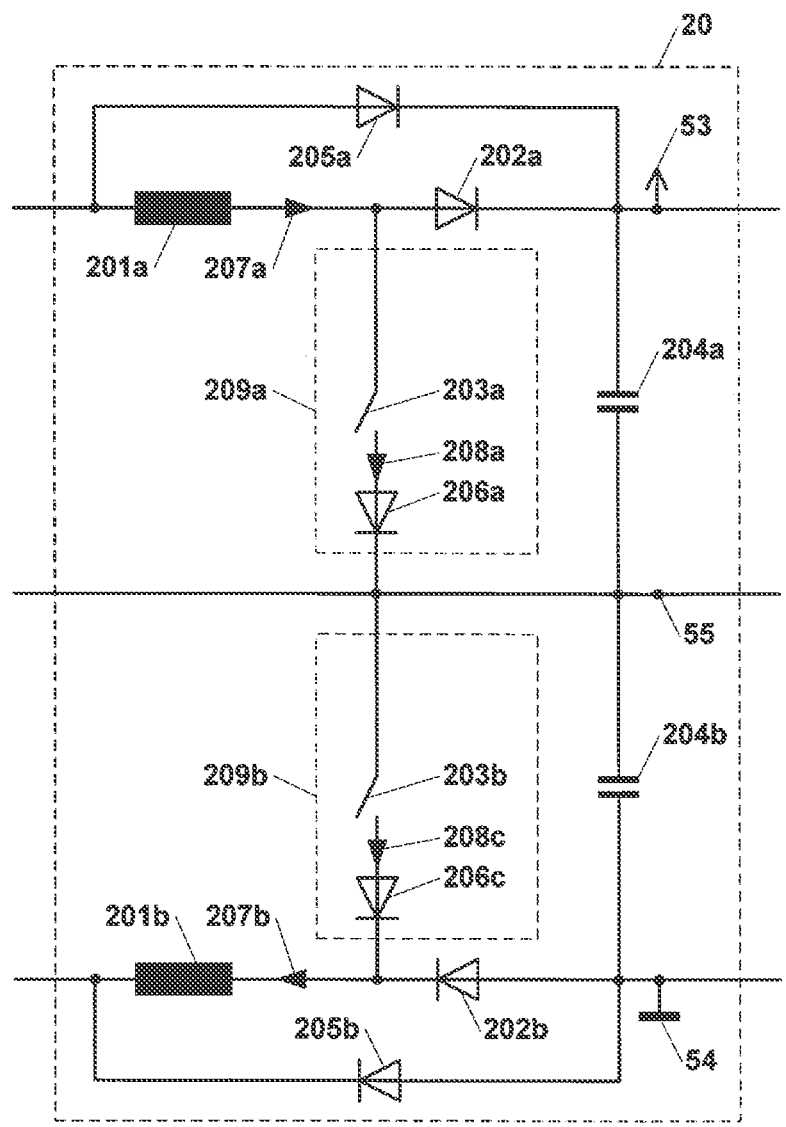

For switches, particularly semiconductor switches, which are not actuated towards the middle potential 55, it is also conceivable to introduce the reverse polarity protection diode into the sections of the switch branches 209*a* and 209*b* that face towards the middle potential 55, as shown in FIG. 14*a*. Furthermore, it is also possible to introduce the reverse polarity protection diodes in each case above the switches 203*a* and 203*b* or in each case below the switches 203*a* and 203*b* in the two switch branches 209*a* and 209*b*, as shown in FIG. 14*b* and FIG. 14*c*. In addition, further elements may be introduced into the switch branches 209*a* and 209*b*, for example measuring resistors for detecting the currents 208/208*a* and 208*b*/208*c* through the switches 203*a* and 203*b*. The electrical output voltage of the voltage converter 20 is supported by a capacitor 204*a* and a capacitor 204*b*.

This results in the same operating principle with respect to reversed input potentials, wherein introduction into both switch branches 209*a* or 209*b* may be useful for the symmetrical step-up converter as symmetrical voltage converter 20 with an input-side middle potential 55, and the same advantages in terms of the electrical losses with regard to the current flowing through the reverse polarity protection diodes as already described with regard to the first embodiment.

A method for operating a multi-stage voltage conversion system with DC input will now be explained in greater detail. By virtue of the method, electrical losses during operation of the voltage conversion system at the rated input voltage can be minimized and an optimal efficiency can be achieved.

It is advantageous for an operating voltage range 86 of a main voltage converter 40 of the voltage conversion system 1 to be kept as small as possible. In addition, it is advantageous to provide, for rated operation, such an operating point for the voltage conversion system 1 as a whole in which the step-up converter as voltage converter 20 is not active, in order to reduce electrical losses. Therefore, the main voltage converter 40 will be optimized for operation with voltages in the upper operating voltage range 86 of the total input voltage range 81, in which also the rated operating input voltage 84 is situated. As a result, the step-up converter as voltage converter 20 is not active during rated operation.

The step-up converter as voltage converter 20 is used to achieve the widest possible input voltage range 81 between a minimum input voltage 82 and a maximum input voltage 85, without the main voltage converter 40 also having to be configured for this wide input voltage range 81. Therefore, the operating voltage range 86 of the main voltage converter 40 is ideally selected to be as narrow as possible and only as large as necessary. If the main voltage converter 40 comprises a transformer, for example, this results in an optimal design of the transformer with a low transformation ratio.

When using a DC link stage 30, the method can be described as follows. Below a minimum input voltage 82, the voltage conversion system 1 as a whole is not in operation in the input voltage range 811. If the input voltage 51 in the input voltage range 812 is lower than the stepped-up DC link voltage 83 to be achieved and greater than the minimum input voltage 82, the step-up converter as voltage converter 20 is active and steps up the DC link voltage 52 in the DC link stage 30 to the stepped-up DC link voltage 83 to be achieved. With effect from an input voltage 51 which is equal to or greater than the stepped-up DC link voltage 83 to be achieved in the input voltage range 813, the step-up converter as voltage converter 20 is not active and the DC link stage 30 is flooded to the permissible maximum input voltage 85. The rated operating input voltage 84 can be selected to be greater than the stepped-up DC link voltage 83 to be achieved.

A controller of the voltage conversion system 1 can actuate the step-up converter as voltage converter 20 and can activate and/or deactivate it as a function of the input voltage 51. According to one embodiment, the minimum input voltage 82 forms a comparison voltage, the exceeding of which leads to activation of the step-up converter as voltage converter 20. According to one embodiment, the stepped-up DC link voltage 83 to be achieved forms a further comparison voltage, the exceeding of which leads to deactivation of the step-up converter as voltage converter 20.

For an embodiment of the voltage conversion system 1 with a split DC link stage 30 using a symmetrical step-up converter as symmetrical voltage converter 20 of FIG. 11, the voltage conversion system 1 is operated as described above, wherein the DC link voltage 52 may be composed of the two partial DC link voltages 521 and 522, which may for example be equal and may each represent half of the total DC link voltage 52. If, when using a symmetrical step-up converter as symmetrical voltage converter 20 with an input-side middle potential of FIG. 13, this is available as an input-side middle potential 55a also at the input of the voltage conversion system 1, then in this case, too, the method as described above can be used, the input voltage 51 now being the sum of the partial input voltages 511 and 512, which may for example be equal and may each represent half of the total input voltage 51.

LIST OF REFERENCE SIGNS 1 voltage conversion system
2 input terminal
3 input terminal
4 input terminal
10 input stage
11 diode
12 diode
20 voltage converter
30 DC link stage
40 main voltage converter
60 output filter stage
51 input voltage
511 partial input voltage
512 partial input voltage
52 DC link voltage
522 partial DC link voltage
521 partial DC link voltage
53 positive potential
54 ground potential
55 middle potential
55a middle potential
201 choke
201a choke
201b choke
202 freewheeling diode
202a freewheeling diode
202b freewheeling diode
203 switch
203a switch
203b switch
204 capacitor
204a capacitor
204b capacitor
205 bypass diode
205a bypass diode
205b bypass diode
206 reverse polarity protection diode
206a reverse polarity protection diode
206b reverse polarity protection diode
206c reverse polarity protection diode
207 current
207a current
207b current
208 current
208a current
208b current
208c current
209 switch branch
209a switch branch
209b switch branch
2031 MOSFET
2032 IGBT
2033 freewheeling diode
2034 JFET
2035 IGBT
2036 JFET
2037 MOSFET
701 effective value
702 effective value
711 peak value
81 input voltage range
811 input voltage range
812 input voltage range
813 input voltage range
82 minimum input voltage
83 DC link voltage
84 rated operating input voltage
85 maximum input voltage
86 operating voltage range

The invention claimed is:
1. A voltage converter comprising:
a first input terminal and a second input terminal, wherein an electrical input voltage is applicable between the first input terminal and the second input terminal;
a switch branch having a switch, wherein the switch is configured to close a circuit path between the first input terminal and the second input terminal;
a reverse polarity protection diode which is connected in series with the switch in the switch branch;
a third input terminal, wherein a further electrical input voltage is applicable between the second input terminal and the third input terminal;
a further switch branch having a further switch, wherein the further switch is configured to close a further circuit path between the second input terminal and the third input terminal; and a further reverse polarity protection diode which is connected in series with the further switch in the further switch branch.

2. The voltage converter according to claim 1, wherein one terminal of the reverse polarity protection diode, including an anode terminal or a cathode terminal of the reverse polarity protection diode, is directly connected to one terminal of the switch.

3. The voltage converter according to claim 1, wherein the reverse polarity protection diode is configured to conduct a current through the switch branch when the input voltage has a first polarity, and to block a current through the switch branch when the input voltage has a second polarity.

4. The voltage converter according to claim 1, wherein the switch is a bipolar transistor, a metal oxide semiconductor field-effect transistor, an insulated-gate bipolar transistor, or a junction field-effect transistor.

5. The voltage converter according to claim 1, wherein the reverse polarity protection diode is a Schottky diode including a silicon carbide Schottky diode.

6. The voltage converter according to claim 1, comprising:
   a first output terminal and a second output terminal, wherein an electrical output voltage can be tapped off between the first output terminal and the second output terminal;
   a choke which is arranged between the first input terminal and a terminal of the switch branch;
   a freewheeling diode which is arranged between the terminal of the switch branch and the first output terminal; and
   a capacitor which is arranged between the first output terminal and the second output terminal.

7. The voltage converter according to claim 6, comprising:
   a bypass diode which is arranged between the first input terminal and the first output terminal.

8. The voltage converter according to claim 1, comprising:
   a current measuring resistor which is connected in series with the switch and the reverse polarity protection diode in the switch branch.

9. The voltage converter according to claim 1, wherein the first input terminal or the second input terminal is connected to a ground potential.

10. The voltage converter according to claim 1, wherein the voltage converter is a DC/DC converter.

11. A voltage conversion system comprising:
   a voltage converter that includes
      a first input terminal and a second input terminal, wherein an electrical input voltage is applicable between the first input terminal and the second input terminal,
      a switch branch having a switch, wherein the switch is configured to close a circuit path between the first input terminal and the second input terminal,
      a reverse polarity protection diode which is connected in series with the switch in the switch branch;
   wherein the voltage conversion system further comprises a main voltage converter which is electrically connected to the voltage converter, wherein the main voltage converter is arranged downstream of the voltage converter; and
   a controller which is configured to actuate the switch of the voltage converter, wherein the controller is configured to compare the input voltage of the voltage converter with a comparison voltage, and wherein the controller is configured to activate the voltage converter if the electrical input voltage of the voltage converter exceeds the comparison voltage.

12. The voltage conversion system according to claim 11, wherein the controller is configured to compare the input voltage of the voltage converter with a further comparison voltage,
   wherein the further comparison voltage is greater than the comparison voltage, and
   wherein the controller is configured to deactivate the voltage converter if the electrical input voltage of the voltage converter exceeds the further comparison voltage.

13. A method for operating a voltage conversion system, wherein the voltage conversion system comprises a voltage converter, a main voltage converter, and a controller,
   the voltage converter including a first input terminal and a second input terminal, wherein an electrical input voltage is applicable between the first input terminal and the second input terminal,
   a switch branch having a switch, wherein the switch is configured to close a circuit path between the first input terminal and the second input terminal,
   a reverse polarity protection diode which is connected in series with the switch in the switch branch,
   wherein the main voltage converter is electrically connected to the voltage converter,
   wherein the main voltage converter is arranged downstream of the voltage converter,
   wherein the controller is configured to actuate the switch of the voltage converter,
the method comprising:
comparing the input voltage of the voltage converter with a comparison voltage, said comparing being carried out by the controller; and
activating the voltage converter if the electrical input voltage of the voltage converter exceeds the comparison voltage, said activating being carried out by the controller.

14. The method according to claim 13, further comprising:
   comparing the input voltage of the voltage converter with a further comparison voltage, this being carried out by the controller, wherein the further comparison voltage is greater than the comparison voltage; and
   deactivating the voltage converter if the electrical input voltage of the voltage converter exceeds the further comparison voltage, said deactivation being carried out by the controller.

* * * * *